(12) United States Patent
Minezaki et al.

(10) Patent No.: US 9,298,663 B2
(45) Date of Patent: Mar. 29, 2016

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Juntaro Minezaki, Chofu (JP); Masashi Agata, Kawasaki (JP); Shinji Hiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 14/101,492

(22) Filed: Dec. 10, 2013

(65) Prior Publication Data
US 2014/0108693 A1 Apr. 17, 2014

Related U.S. Application Data

(63) Continuation of application No. PCT/JP2011/063732, filed on Jun. 15, 2011.

(51) Int. Cl.
*G06F 13/40* (2006.01)
*G06F 13/10* (2006.01)
*G06F 9/44* (2006.01)

(52) U.S. Cl.
CPC ............ *G06F 13/409* (2013.01); *G06F 9/4403* (2013.01); *G06F 13/102* (2013.01)

(58) Field of Classification Search
CPC .... G06F 13/409; G06F 13/102; G06F 9/4403
See application file for complete search history.

(56) References Cited

U.S. PATENT DOCUMENTS 5,887,145 A * 3/1999 Harari et al. ................... 710/301
6,009,492 A * 12/1999 Matsuoka ...................... 710/301
(Continued)

FOREIGN PATENT DOCUMENTS

| JP | H01-311351 | 12/1989 |
| JP | H10-097414 | 4/1998 |
| JP | 2000-293474 | 10/2000 |
| JP | 2003-084984 A | 3/2003 |
| JP | 2009-122963 A | 6/2009 |

OTHER PUBLICATIONS

International Search Report, mailed in connection with PCT/JP2011/063732 and mailed Sep. 20, 2011.
(Continued)

*Primary Examiner* — Nimesh G Patel
(74) *Attorney, Agent, or Firm* — Fujitsu Patent Center

(57) ABSTRACT

An information processing apparatus includes an interface configured to be connected with a connection apparatus, an acquisition unit configured to acquire apparatus information including a configuration or an operation specification of the connection apparatus connected with the interface, a determination unit configured to determine a control program to control the connection apparatus according to the apparatus information, and a control unit configured to use the determined control program to control the connection apparatus, wherein the connection apparatus includes an expansion connection unit and an expansion apparatus connected with the expansion connection unit, and the acquisition unit includes a first acquisition unit configured to acquire first information including a configuration or an operation specification of the expansion connection unit connected with the interface, and a second acquisition unit configured to acquire second information including a configuration or an operation specification of the expansion apparatus connected with the expansion connection unit.

9 Claims, 33 Drawing Sheets

(56) References Cited

U.S. PATENT DOCUMENTS

| | | | |
|---|---|---|---|
| 6,055,595 | A | 4/2000 | Tachibana et al. |
| 6,401,198 | B1 | 6/2002 | Harmer et al. |
| 6,892,263 | B1* | 5/2005 | Robertson .................... 710/301 |
| 8,069,293 | B1* | 11/2011 | Rogan et al. ................. 710/301 |
| 2003/0051069 | A1 | 3/2003 | Iida |
| 2008/0148353 | A1* | 6/2008 | Dohi ............................... 726/2 |
| 2009/0100233 | A1* | 4/2009 | Worster ........................ 711/154 |
| 2009/0132683 | A1 | 5/2009 | Furuyama et al. |

OTHER PUBLICATIONS

Notification of Transmittal of Translation of The International Preliminary Report on Patentability (Form PCT/IB/338, Form PCT/IB/373 & Form PCT/ISA/237), PCT/JP2011/063732, 6 pages, dated Jan. 3, 2014.

* cited by examiner

FIG. 14

```
<SERVER INFORMATION>
  <MODEL INFORMATION>
    <MANUFACTURER>MANUFACTURER A</MANUFACTURER>
    <MODEL>SERVER A</MODEL>
    <SERIAL>0123498765</SERIAL>
  </MODEL INFORMATION>
  <CPU>
    <MODEL>CPU B</MODEL>
    <FREQUENCY>1.2GHz</FREQUENCY>
  </CPU>
  <CHIPSET>
    <MODEL>CHIPSET C</MODEL>
  </CHIPSET>
  <MEMORY>
    <0>
      <CAPACITY>4GB</CAPACITY>
    </0>
    <1>
      <CAPACITY>4GB</CAPACITY>
    </1>
  </MEMORY>
</SERVER INFORMATION>
<EXPANSION CARD INFORMATION>
  <0>
    <VENDOR ID>1111</VENDOR ID>
    <DEVICE ID>2222</DEVICE ID>
    <CLASS CODE>0C0400</CLASS CODE>
    <SUBSYSTEM VENDOR ID>3333</SUBSYSTEM VENDOR ID>
    <SYSTEM VENDOR ID>4444</SYSTEM VENDOR ID>
  </0>
  <1>
    <VENDOR ID>1111</VENDOR ID>
    <DEVICE ID>2222</DEVICE ID>
    <CLASS CODE>0C0400</CLASS CODE>
    <SUBSYSTEM VENDOR ID>5555</SUBSYSTEM VENDOR ID>
    <SUBSYSTEM ID>6666</SUBSYSTEM ID>
  </1>
</EXPANSION CARD INFORMATION>
```

| IP ADDRESS | EXTERNAL APP TYPE |
|---|---|
| 10.0.0.100 | FCSW-012 |
| 10.0.0.101 | FCSW-012 |

```
<EXTERNAL APPARATUS INFORMATION>
   <0>
      <IP ADDRESS>10.0.0.100</IP ADDRESS>
      <VENDOR NAME>VNDR</VENDOR NAME>
      <MODEL NUMBER>VFCSW5678</MODEL NUMBER>
      <FW VERSION>0101</FW VERSION>
   </0>
   <1>
      <IP ADDRESS>10.0.0.101</IP ADDRESS>
      <VENDOR NAME>VNDR</VENDOR NAME>
      <MODEL NUMBER>VFCSW5678</MODEL NUMBER>
      <FW VERSION>0101</FW VERSION>
   </1>
</EXTERNAL APPARATUS INFORMATION>
```

| INPUT | | | | | OUTPUT |
|---|---|---|---|---|---|
| VENDOR ID | DEVICE ID | CLASS CODE | SUBSYSTEM VENDOR ID | SUBSYSTEM ID | EXP CARD ID |
| 1111 | 2222 | 0C0400 | 3333 | 4444 | 00001234 |
| 1111 | 2222 | 0C0400 | 7777 | 6666 | 00002234 |
| ... | ... | ... | ... | ... | ... |

| INPUT | | | | OUTPUT | |
|---|---|---|---|---|---|
| SERVER INFO | EXP CARD ID1 | EXP CARD ID2 | EXTERNAL APPARATUS | FW1 | FW2 |
| | | | | | |
| SERVER A | 00001234 | – | – | ... EXP BIOS A | – ... |
| SERVER A | 00001234 | – | VFCSW5678 FW 0101 | ... EXP BIOS C | – ... |
| SERVER A | 00001234 | 00002234 | – | ... EXP BIOS B | – ... |
| SERVER A | 00001234 | 00002234 | VFCSW5678 FW 0101 | ... EXP BIOS C | – ... |

FIG. 42

```
<SERVER INFORMATION>
   <MODEL INFORMATION>
      <MANUFACTURER>MANUFACTURER A</MANUFACTURER>
      <MODEL>SERVER A</MODEL>
      <SERIAL>0123498765</SERIAL>
   </MODEL INFORMATION>
   <CPU>
      <MODEL>CPU B</MODEL>
      <FREQUENCY>1.2GHz</FREQUENCY>
   </CPU>
   <CHIPSET>
      <MODEL>CHIPSET C</MODEL>
   </CHIPSET>
   <MEMORY>
      <0>
         <CAPACITY>4GB</CAPACITY>
      </0>
      <1>
         <CAPACITY>4GB</CAPACITY>
      </1>
   </MEMORY>
</SERVER INFORMATION>
<EXPANSION CARD INFORMATION>
   <0>
      <VENDOR ID>1111</VENDOR ID>
      <DEVICE ID>2222</DEVICE ID>
      <CLASS CODE>0C0400</CLASS CODE>
      <SUBSYSTEM VENDOR ID>5555</SUBSYSTEM VENDOR ID>
      <SUBSYSTEM ID>6666</SUBSYSTEM ID>
      <USED EXPANSION BIOS>EXPANSION BIOS A</USED EXPANSION BIOS>
   </0>
   <1>
      <VENDOR ID>1111</VENDOR ID>
      <DEVICE ID>2222</DEVICE ID>
      <CLASS CODE>0C0400</CLASS CODE>
      <SUBSYSTEM VENDOR >3333</SUBSYSTEM VENDOR>
      <SUBSYSTEM ID >4444</SUBSYSTEM ID>
      <USED EXPANSION BIOS>EXPANSION BIOS A</USED EXPANSION BIOS>
   </1>
</EXPANSION CARD INFORMATION>
<EXTERNAL APPARATUS INFROMATION>
   <0>
      <VENDOR NAME>VNDR</VENDOR NAME>
      <MODEL UNMBER>VFCSW5678</MODEL SUNBER>
      <FW VERSION>0101</FW VERSION>
   </0>
   <1>
      <VENDOR NAME>VNDR</VENDOR NAME>
      <MODEL NUMBER>VFCSW5678</MODEL NUMBER>
      <FW VERSION>0101</FW VERSION>
   </1>
</EXTERNAL APPARATUS INFORMATION>
```

INFORMATION PROCESSING APPARATUS AND INFORMATION PROCESSING METHOD

CROSS-REFERENCE TO RELATED APPLICATION

This application is a continuation application of International Application PCT/JP2011/063732 filed on Jun. 15, 2011 and designated the U.S., the entire contents of which are incorporated herein by reference.

FIELD

The present invention relates to an information processing apparatus including an interface which is connectable with a connection apparatus, an information processing method and a program.

BACKGROUND

FIG. 1 exemplifies a configuration of a computer apparatus which is connectable with an expansion card. One of program groups for controlling each device of the computer apparatus is Basic Input/Output System (BIOS). On the other hand, the functions of information apparatus such as the computer apparatus are expanded by adding an expansion card or an external apparatus via an expansion card. The expansion card installed in the computer apparatus is controlled by using a computer program for controlling the input/output which is called expansion Basic Input/Output System (expansion BIOS). Hereinafter, BIOS which handles the control of each device included in the basic configuration of the computer apparatus is defined as basic BIOS.

Basic BIOS is stored in a Read Only Memory (ROM) on a motherboard for example. Here in FIG. 1, the ROM is included in the memory. On the other hand, BIOS for expanding the basic BIOS for controlling devices which the basic BIOS does not handle is referred to as expansion BIOS. The data image of the expansion BIOS is generally stored in a storage component such as an EEPROM on the expansion card. Hereinafter, the data image of expansion BIOS is referred to as expansion BIOS data. When the computer apparatus is booted, the computer apparatus uses basic BIOS to search expansion BIOS in the storage component of the expansion card. Then, the computer apparatus transfers the expansion BIOS onto the memory to make the expansion BIOS available.

FIG. 2 illustrates the process flow in the computer apparatus as illustrated in FIG. 1. For example, the computer apparatus is booted by a boot operation by a user etc. (S501). When the computer apparatus is booted, the basic BIOS is called, first, the initialization of the Central Processing Unit (CPU) and the memory and the like is performed, and next, resources are allocated to each equipped device (S502). Here, for example, the initial settings for the register values of the CPU such as zero clearance exemplify the initialization. Additionally, the address setting for the areas used as registers to the equipped devices in which the memories are used as registers exemplifies the resource allocations to the equipped devices. Hereinafter, when the CPU performs processes according to computer programs such as the basic BIOS, it merely explained that the computer programs such as the basic BIOS perform the processes.

When the resource allocation to each device is completed, the basic BIOS searches for the expansion BIOS in the storage component of each expansion card which is connected with the computer apparatus (S503), and then transfers each expansion BIOS onto the memory of the computer apparatus (S504). Each expansion BIOS performs the initialization, the initial setting and the control of the corresponding expansion card (S505).

And then the basic BIOS boots the Operating System (OS) (S506). For example, it is assumed that the configuration is employed in which an expansion card is connected with a storage apparatus. When the basic BIOS of the computer apparatus read out data from the storage apparatus connected with the expansion card, the computer apparatus obtains the expansion BIOS in advance in S503 and S504 and uses the expansion BIOS to control the expansion card. Otherwise, when the expansion BIOS is not used, the basic BIOS of the computer apparatus fails to read out data from the storage apparatus connected with the expansion card.

PATENT DOCUMENT

[Patent document 1] Japanese Laid-Open Patent Publication No. 2009-122963
[Patent document 2] Japanese Laid-Open Patent Publication No. Hei01-311351

SUMMARY

An information processing apparatus exemplifies an aspect of the techniques disclosed herein. And it is provided an information processing apparatus including an interface configured to be connected with a connection apparatus, an acquisition unit configured to acquire apparatus information including a configuration or an operation specification of the connection apparatus connected with the interface, a determination unit configured to determine a control program to control the connection apparatus according to the apparatus information, and a control unit configured to use the determined control program to control the connection apparatus, wherein the connection apparatus includes an expansion connection unit and an expansion apparatus connected with the expansion connection unit, and the acquisition unit includes a first acquisition unit configured to acquire first information including a configuration or an operation specification of the expansion connection unit connected with the interface, and a second acquisition unit con figured to acquire second information including a configuration or an operation specification of the expansion apparatus connected with the expansion connection unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 14 is a diagram exemplifying configuration information;

FIG. 42 is a diagram exemplifying configuration information;

DESCRIPTION OF EMBODIMENTS

First, computer apparatus according to comparative examples are described. Following the comparative examples, embodiments are described. In the comparative examples, the computer apparatus obtains an expansion BIOS appropriate for an expansion card in order to control the expansion card. To the contrary, when an appropriate expansion BIOS is not found, the computer apparatus fails to control the expansion card in some cases. In Comparative Examples 1 and 2 below, problems which occur when an inappropriate expansion BIOS is used are described. In addition, in Comparative Example 3 below, problems which occur when an appropriate expansion BIOS is obtained are described.

Hereinafter, a connection unit such as an expansion card which is added to a computer apparatus is referred to as expansion connection unit. Further, an apparatus such as a storage apparatus which is connected with a computer apparatus via an expansion connection unit is referred to as external apparatus.

Comparative Example 1

Figure 1:
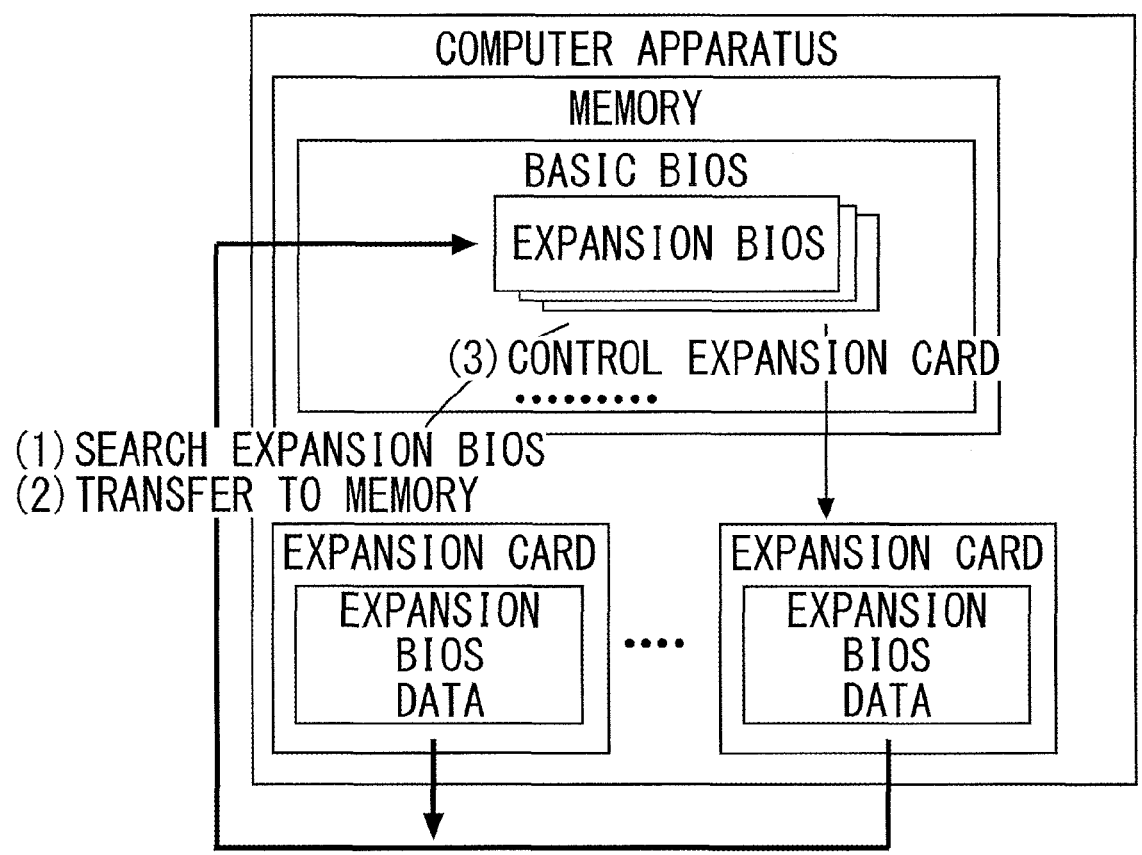
FIG. 1 is a diagram exemplifying the configuration of a computer apparatus to which an expansion card is connected.
Figure 2:
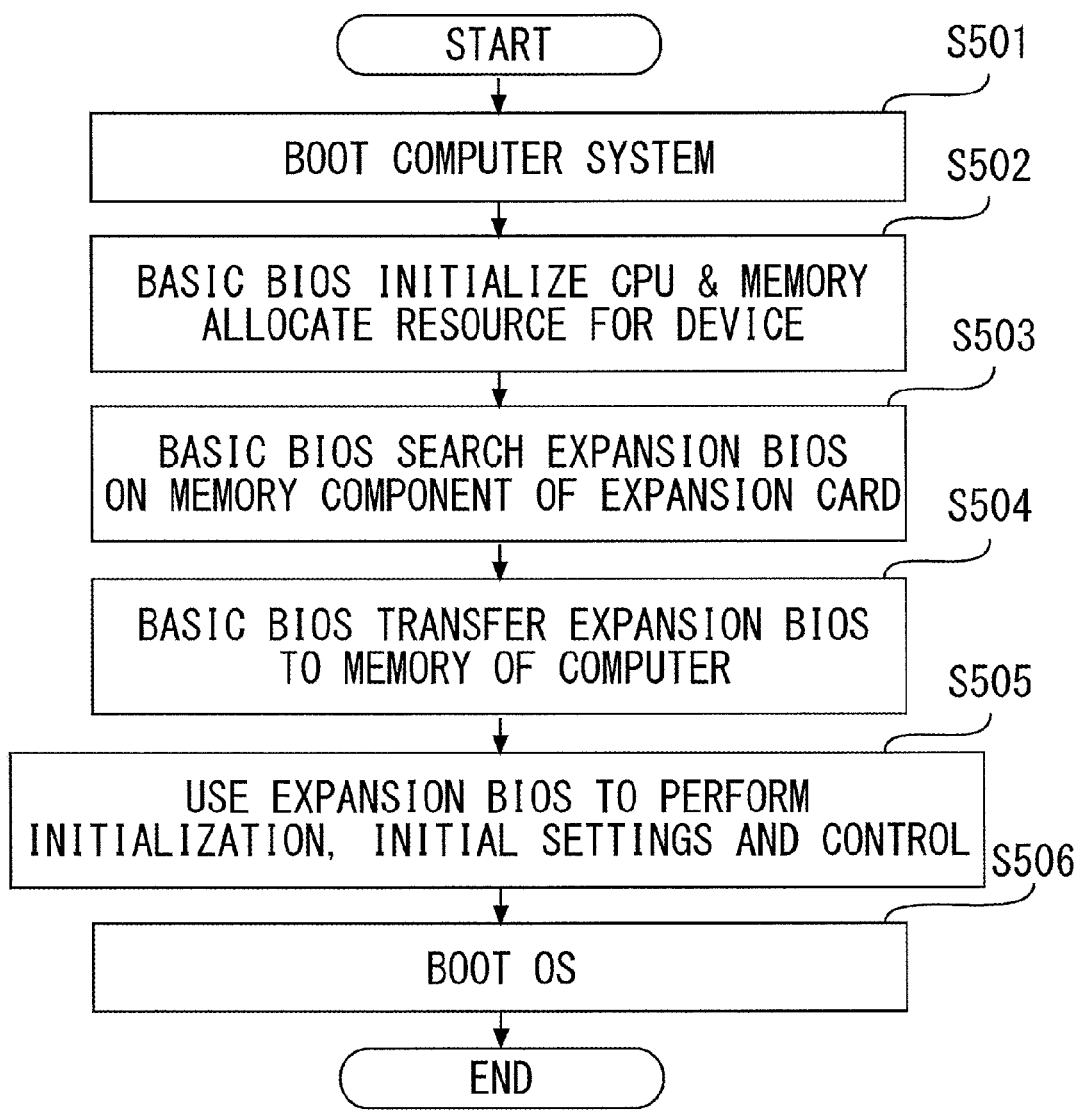
FIG. 2 is a diagram exemplifying a flow of processes performed in the computer apparatus.
Figure 3:
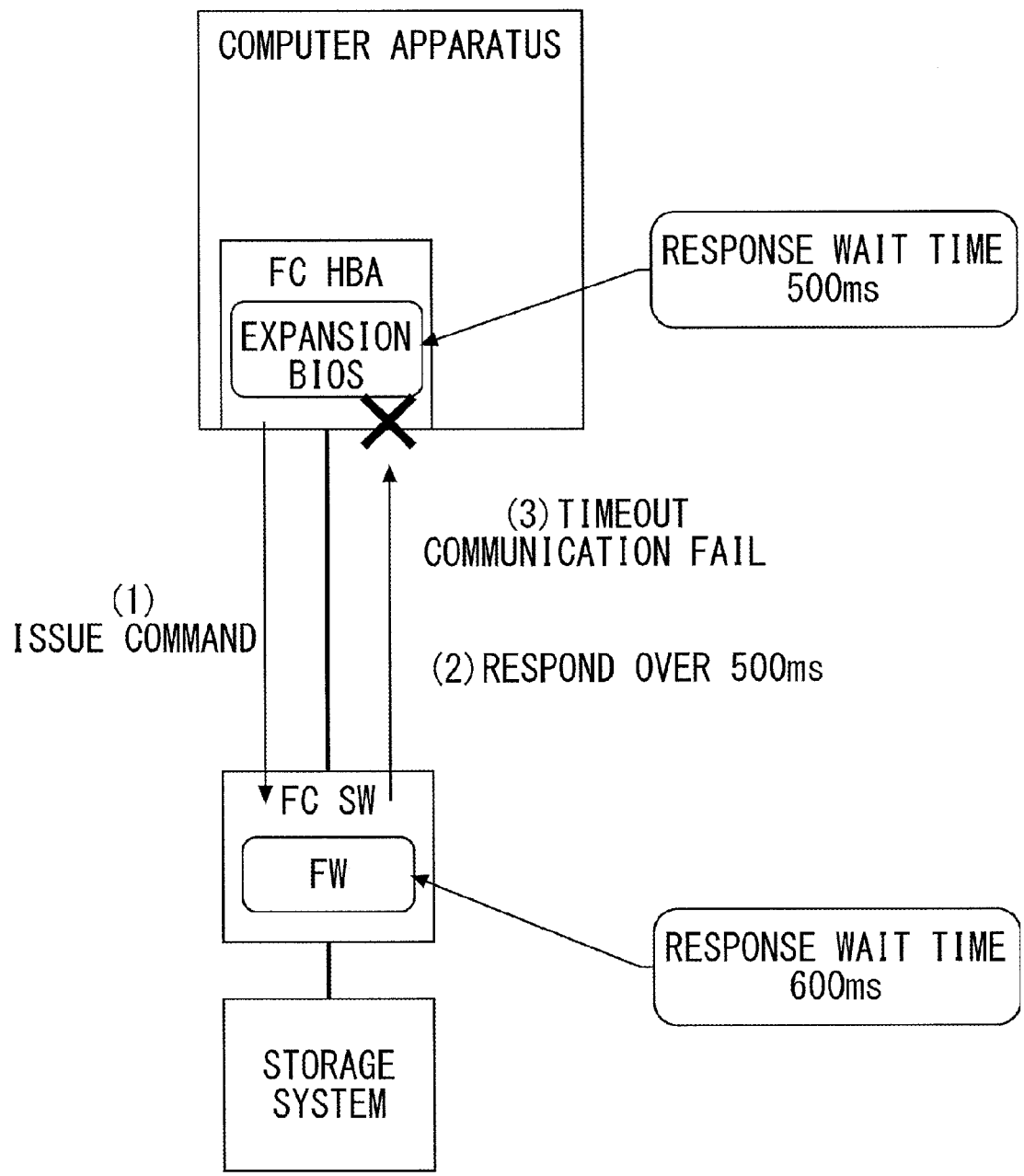
FIG. 3 is a diagram exemplifying a problem which occurs in the communication between an expansion connection unit and an external apparatus connected with the expansion connection unit.

In the communication between an expansion connection unit and an external apparatus connected with the expansion connection unit, a problem occurs in some cases due to the version of a control program such as expansion BIOS. FIG. 3 is a diagram illustrating a comparative example which occurs in the communication between an expansion connection unit and an external apparatus connected with the expansion connection unit. In FIG. 3, a Fibre Channel Host Bus Adapter (hereinafter referred to as "FC HBA") is illustrated as an example of the expansion connection unit. In addition, the FC HBA is connected with a Fibre Channel Switch (hereinafter referred to as "FC SW") as an example of the external apparatus. Furthermore, the FC SW is connected with a storage system. Hereinafter, an interface employing the fibre channel such as the connection between FC HBA and FC SW is referred to as fibre channel interface.

In the fibre channel interface, vendors providing devices including FC HBA and FC SW are allowed to independently define several setting values such as wait time during when a command is transmitted until a response is received. The setting values are included in a control program for controlling the device. The setting values for the FC HBA are set in expansion BIOS and the setting values for the FC SW are set in the firmware (FW) in the FC SW.

Here, it is assumed for example that the response wait time of the FC HBA is set to 500 ms and the response processing time of the FC SW is set up to 600 ms. In these settings, the FC HBA operates with the response time limit of 500 ms after a command is generated. On the other hand, the FC SW transmits a response within 600 ms.

When the response processing time of the FC SW exceeds 500 ms, a timeout occurs on the FC HBA side and the communication fails. When the communication fails while the FC HBA and the FC SW are trying to establish the connection, the connection between the FC HBA and the FC SW also fails and the computer apparatus fails to access the storage system.

In order to avoid the problems as described above in the example in FIG. 3, expansion BIOS may be employed such that the response wait time of the FC HBA is set to equal to or longer than 600 is in accordance with the response processing time of the FC SW. The expansion BIOS with different setting values are distinguished by the versions of the control programs for example. Thus, the appropriate versions of control programs are employed in order to solve the problems as illustrated in FIG. 3.

However, the problems which are caused by an inappropriate control program when the expansion connection unit and the external apparatus are not limited to problems caused due to the difference between the response wait time and the response processing time. Namely, the problems as illustrated in FIG. 3 are caused by a variety of reasons other than the relation between the response wait time and the response processing time. Thus, vendors evaluate and demonstrate the combinations between the versions of control programs such as firmware of external apparatus and the versions of control programs such as BIOS of the expansion connection units in order to guarantee the operations with the combinations between the versions of control programs of the external apparatus and the versions of control programs of the expansion connection units.

Comparative Example 2

Figure 4:
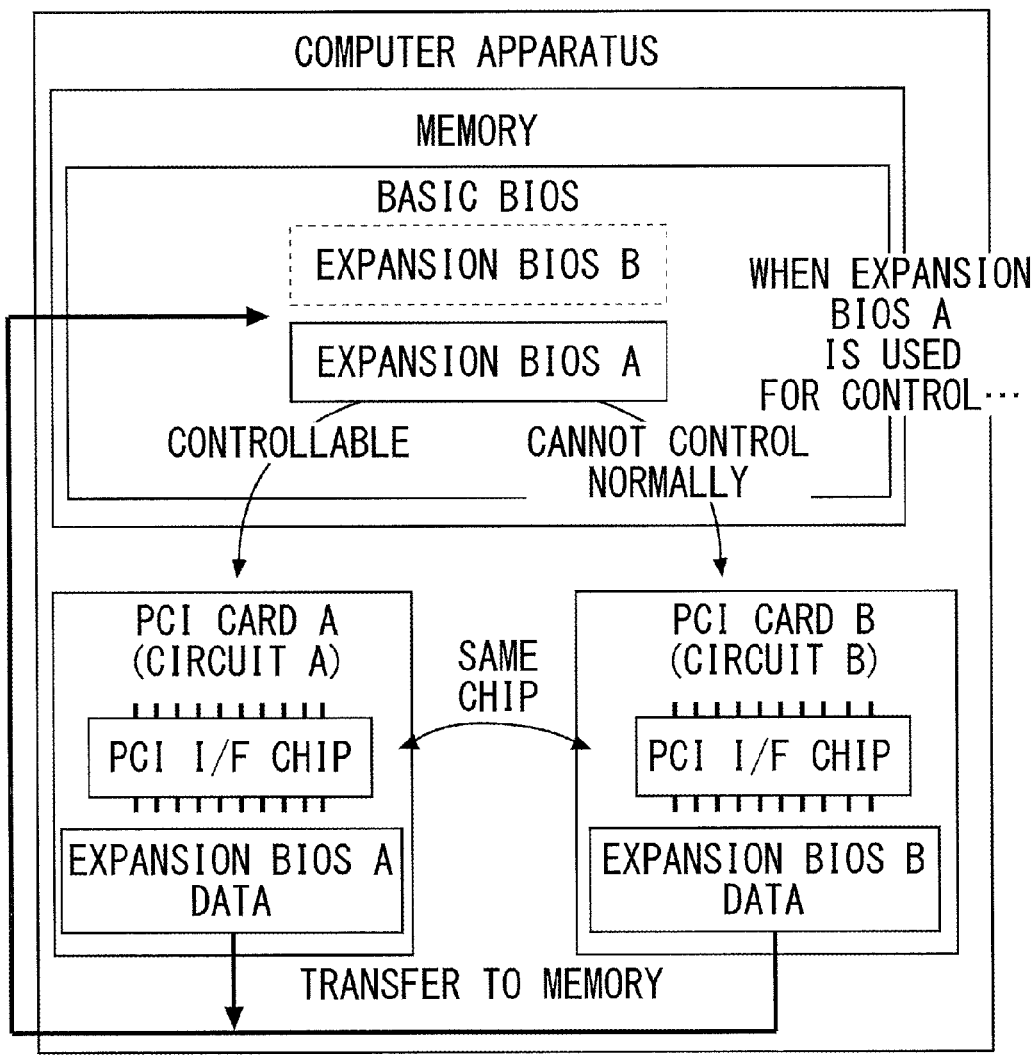
FIG. 4 is a diagram exemplifying a problem in combinations with an expansion connection unit.

In some cases the basic BIOS fails to appropriately control an expansion connection unit according to the combination with the expansion connection unit installed in the computer apparatus. FIG. 4 exemplifies a problem caused by a combination with an expansion connection unit. In FIG. 4, a PCI card A and a PCI card B are installed as examples of expansion connection units in a computer apparatus.

It is assumed that each PCI card is manufactured by the same vendor and the PCI card B is a more recent product. A PCI card includes a controller for providing functions corresponding to the type of the PCI card. A controller installed in a PCI card is called a PCI bus interface chip (hereinafter referred to as PCI I/F chip). The types of PCI cards mean for example the types of a variety of interfaces such as FC HBA or cards conforming video standards and the like. It is assumed that a PCI I/F chip installed in each PCI card is the same type.

The vendor ID, device ID) and class code of a PCI card is set for each PCI I/F chip. Therefore, the PCI card A and the PCI card B include a common vendor ID, device ID and class code. On the other hand, the circuit configurations of the respective PCI cards are different illustrated as the circuit A and the circuit B. That is, the circuit for each PCI card differs from each other in regard to the definitions of detailed operations and operation properties.

It is assumed here that expansion BIOS A and expansion BIOS B are installed in a ROM in each PCI card. In addition, the expansion BIOS does not handle the control of the new product expansion BIOS B in many cases. To the contrary, the expansion BIOS B handles the control of both the PCI card A and the PCI card B in many cases.

When the computer apparatus is booted, the expansion BIOS A and the expansion BIOS B are transferred onto the memory. The expansion BIOS determines the control targets based on the vendor IDs, device IDs, class codes and other PCI card identifiers. However, the identifiers used for the determination depends on the expansion BIOS. Thus, for example, when the vendor IDs, device IDs and class codes are used for the determination criteria, the PCI card A and the PCI card B, which use the same semiconductor chip, are determined as the same card. As a result, there is a case in which expansion BIOS A or expansion BIOS B is used for controlling both the PCI card A and the PCI card B.

In the example in FIG. 4, the expansion BIOS A of the PCI card A does not handle the control of the PCI card B, which is a newer product than the PCI card A. Therefore, when the expansion BIOS A alone is used for controlling the PCI cards, the PCI card B does not operate as expected.

In order to solve the problem, the expansion BIOS B which is capable of controlling both the PCI card A and the PCI card B is used. Thus, when a plurality of expansion connection units with the same type are used, it is problematic to determine a control program for controlling the plurality of expansion connection units to be used.

Comparative Example 3

As for the two problems as described above, the problem example 1 is solved by checking the operation assurance information provided by the vendor and employing appropriate expansion BIOS. The problem example 2 is solved by changing the expansion BIOS A with the expansion BIOS B to be installed in the PCI card A in order to use the expansion BIOS B without problem. Alternately, the basic BIOS is set so that the expansion BIOS A is not used.

A user of the computer apparatus is responsible for appropriately employing control, programs for the expansion connection units connected with the computer apparatus in order to avoid such a situation that the computer apparatus does not normally control an expansion connection unit. The below descriptions show a problem that employing appropriate expansion BIOS is a burden to the user. Here, it is given an example of procedures for updating the expansion BIOS data of an expansion card.

The user acquires a dedicated tool for updating the expansion BIOS data. And the user performs a writing process to write the dedicated tool onto a storage medium. In addition, the user prepares the Operating System (OS) for initiating the dedicated tool. Normally, the computer apparatus includes an OS boot monitoring function. For example, a computer apparatus force-quits and re-boots the OS after a predetermined time elapses when the OS is not booted by a specific boot device. Therefore, the user checks the settings of the computer apparatus for the OS boot monitoring function, the boot device and the like and appropriately sets the computer apparatus to refrain from force-quitting and re-booting the OS.

Next, the user inserts the boot disk of the OS for the dedicated tool into the computer apparatus. And the user powers up the computer apparatus and boots the OS from the boot disk. When the OS is booted, the user inserts the storage medium in which the dedicated tool is written into the computer apparatus. And then the user starts up the dedicated tool on the OS to update the expansion BIOS data which is stored in the storage component on the expansion card. And then the user restores the settings of the computer apparatus such as the settings of the OS boot monitoring function and the boot device.

As described above, the updating of the expansion BIOS data is executed by using the dedicated tool corresponding to the target expansion card. When the user of the computer apparatus obtains the dedicated tool, the user checks the product information including the model number of the expansion card to be updated and search for an appropriate expansion BIOS which the vendor of the expansion card or the vendor of the computer apparatus provides.

It is noted that when the OS is included in the dedicated tool the OS boot disk for the dedicated tool is not used. However, the user checks and prepares a storage medium in which the dedicated tool is written and a drive for reading and writing. In addition, the user checks that the OS boot monitoring function is deactivated in the computer apparatus and the settings of the boot device is configured without problem in order to update the expansion BIOS data.

As described above, the work as described above is done as for the configuration change of the computer apparatus, the update of the expansion BIOS, the update of the firmware of the external apparatus and the like in order to ensure that the computer apparatus controls the expansion card. In conventional techniques, the user of information processing apparatus such as a computer apparatus set an appropriate control program for the expansion connection unit according to the configurations of the expansion connection unit connected with the information processing apparatus and the external apparatus connected with the expansion connection unit.

Hereinafter, the expansion connection unit and the external apparatus are generally referred to as connection apparatus. Moreover, the external apparatus are also referred to as expansion apparatus.

The details of an information processing apparatus according to an embodiment are described below with reference to the drawings. The configurations in the following embodiments are provided for the purpose of illustration, the information processing apparatus in the present embodiment is not limited to the configurations in the embodiments as described below.

Example 1

In Example 1, a computer apparatus which controls input and output by basic BIOS and expansion BIOS is exemplified as an information processing apparatus. In Example 1, the data of appropriate expansion BIOS according to the configuration of the computer apparatus is prepared in an area other than a storage component on an expansion card. The basic BIOS controls the expansion card by using the expansion BIOS prepared in the storage area other than the expansion card. The expansion BIOS is an example of a control program.

Figure 5:
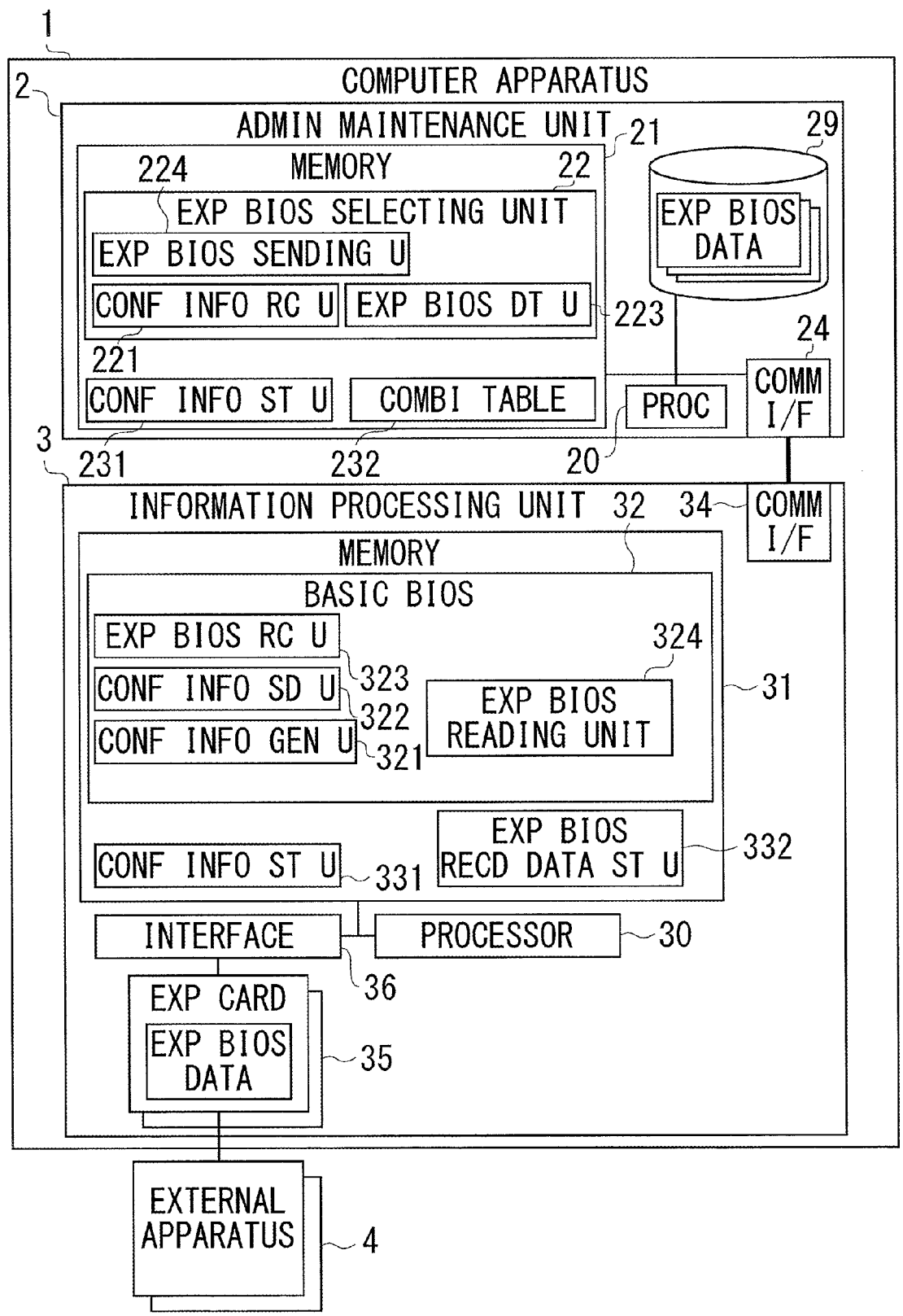
FIG. 5 is a diagram exemplifying the configuration of a computer apparatus according to example 1.

The configuration of a computer apparatus 1 according to Example 1 is exemplified in FIG. 5. The computer apparatus 1 is an example of an information processing apparatus. The computer apparatus 1 includes an information processing unit 3 and an administration maintenance unit 2. The information processing unit 3 provides a variety of functions of the computer apparatus 1 for users. On the other hand, the administration maintenance unit 2 provides a variety of administration functions such as updating of computer programs performed by the information processing unit 3.

The information processing unit 3 includes a processor 30 and an interface 36 connected with the processor 30. The processor 30 is connected with expansion cards 35 via the interface 36 and is connected with external apparatus 4 via the expansion cards 35. The expansion card 35 is an example of a connection apparatus. In addition, the external apparatus 4 is an example of an expansion apparatus. Further, the combination of the expansion card 35 and the external apparatus 4 is an example of a connection apparatus. Moreover, the processor is an example of a control unit.

The interface 36 sends and receives data between an internal bus connected with the processor and an external bus connected with a peripheral device. In the information processing unit 3 in Example 1, the interface 36 is not limited to a particular type. Examples of the interface 36 include Peripheral Component Interconnect (PCI), PCI-X, PCI Express and InfiniBand. The configuration of the information processing unit 3 is flexibly modified by adding the combination of the expansion card 35 and the external apparatus 4 connected with the expansion card 35 to the interface 36.

In the information processing unit 3, basic BIOS 32 is stored in a memory 31. The information processing unit 3 provides an input and output function when the processor 30 executes the basic BIOS 32. The basic BIOS 32 includes a configuration information generating unit 321, a configuration information sending unit 322, an expansion BIOS receiving unit 323 and an expansion BIOS reading unit 324. A processor (not illustrated) in the information processing unit 3 executes the basic BIOS stored in the memory 31 to function as the configuration information generating unit 321, the configuration information sending unit 322, the expansion BIOS receiving unit 323 and the expansion BIOS reading unit 324. Hereinafter, the descriptions such as "the configuration information generating unit 321 performs a process" mean that "the processor 30 of the information processing apparatus 3 performs a process by using functional units such as the configuration information generating unit 321". In addition, the memory 31 includes a configuration information storing unit 331 and the expansion BIOS received data storing unit 332 as parts of the storage area.

The configuration information generating unit 321 uses the apparatus information stored in a ROM and the like built in the computer apparatus 1 or the information stored in a ROM and the like built in each hardware included in the information processing unit 3 to generate configuration information of the computer apparatus and stores the generated information in the configuration information storing unit 331. Information such as the manufacturer, the model, the processor type, the memory capacity and the interface type for peripheral apparatus of the computer apparatus 1 exemplify the configuration information of the computer apparatus 1.

The configuration information sending unit 322 sends the configuration information stored in the configuration information storing unit 331 to the administration maintenance unit 2. The expansion BIOS receiving unit 323 receives the expansion BIOS data sent from the administration maintenance unit 2 and stores the received data in the expansion BIOS received data storing unit 332. The expansion BIOS reading unit 324 reads the expansion BIOS data in the expansion BIOS received data storing unit 332 and transfers the read data to the memory 31 of the information processing unit 3.

The configuration information storing unit 331 stores the configuration information generated by the configuration information generating unit 321. The expansion BIOS received data storing unit 332 stores the expansion BIOS data received by the expansion BIOS receiving unit 323. In addition, the information processing unit 3 includes a communication interface (hereinafter, referred to as a communication I/F) for communicating with the administration maintenance unit 2.

The administration maintenance unit 2 is operated by a processor 20 and a memory 21 which are separated from the information processing unit 3. Further, the administration maintenance unit 2 includes a storage apparatus 29. The storage apparatus 29 stores the expansion BIOS data.

The administration maintenance unit 2 holds computer programs for providing the functions of the expansion BIOS selecting unit 22. In addition, the expansion BIOS selecting unit 22 includes a configuration information receiving unit 221, an expansion BIOS determination unit 223 and an expansion BIOS sending unit 224. The processor 20 of the administration maintenance unit 2 executes the computer programs stored in the memory 21 to function as the expansion BIOS selecting unit 22, the configuration information receiving unit 221, the expansion BIOS determination unit 223 and the expansion BIOS sending unit 224. Hereinafter, the descriptions such as "the expansion BIOS selecting unit 22 performs a process" mean that "the processor 20 of the administration maintenance unit 2 performs a process as the expansion BIOS selecting unit 22". The administration maintenance unit 2 stores a configuration information storing unit 231 and a combination table 232 in the memory 21.

The configuration information receiving unit 321 receives the configuration information sent from the information processing unit 3 and stores the received information in the configuration information storing unit 231. The expansion BIOS determination unit 223 collates the configuration information stored in the configuration information storing unit 231 and the combination table 232 to determine the expansion BIOS data in accordance with the configuration of the computer apparatus 1. The expansion BIOS sending unit 224 reads out the determined the expansion BIOS data from the storage apparatus 29 included in the administration maintenance unit 2 and sends the read data to the information processing unit 3.

The configuration information storing unit 231 stores the configuration information of the computer apparatus 1 received by the configuration information receiving unit 221. The configuration information in Example 1 is an example of apparatus information. The combination table 232 is referenced and used in an expansion BIOS determination process performed by the expansion BIOS determination unit 223. Further, the administration maintenance unit 2 includes a communication I/F 24 for communicating with the information processing unit 3.

Figure 6:
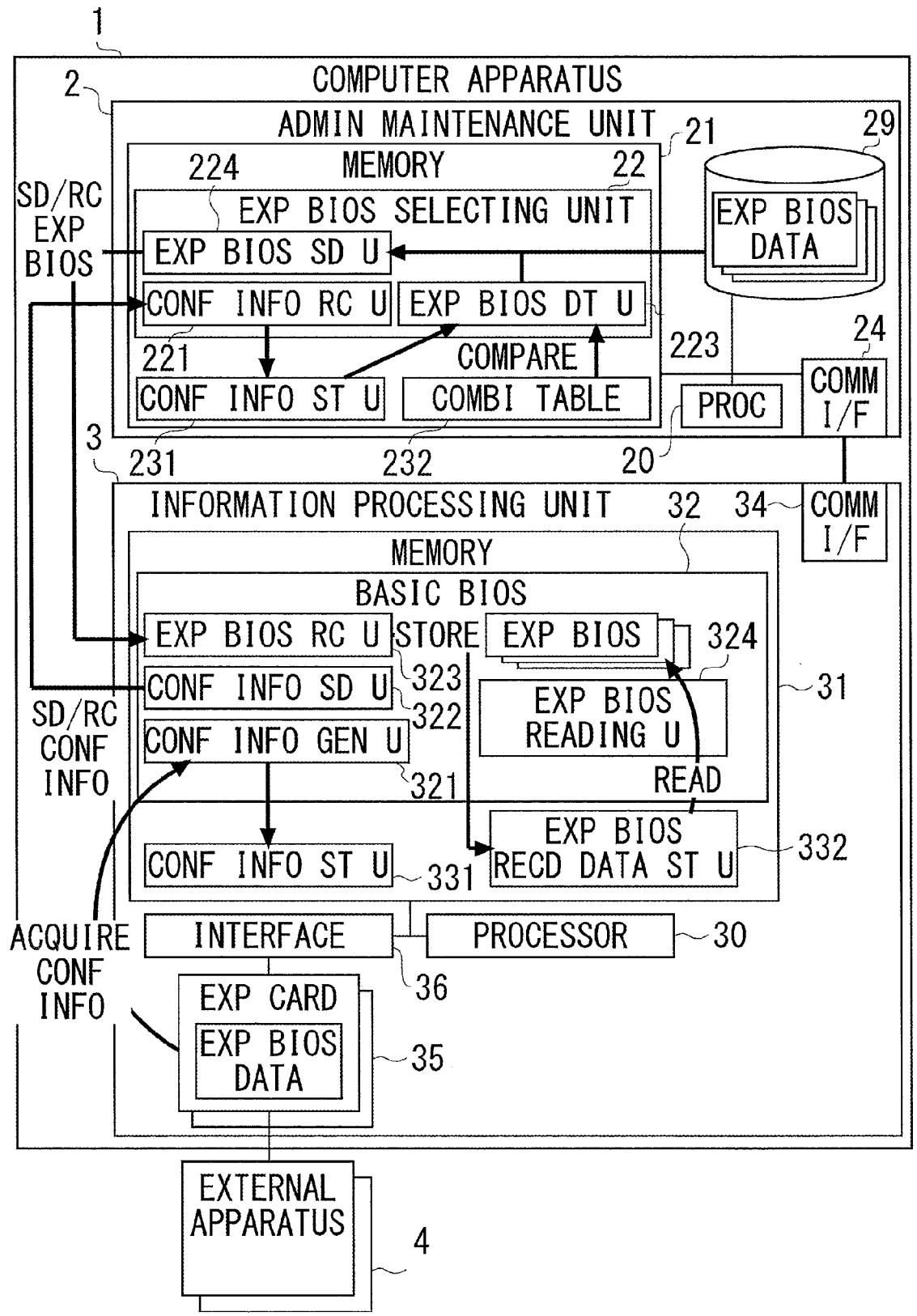
FIG. 6 is a diagram schematically exemplifying processes performed in the computer apparatus.

FIG. 6 exemplifies the outlines of the processes performed in the computer apparatus 1. In addition, FIG. 7 exemplifies operation flows in the computer apparatus 1. The processes performed in the computer apparatus 1 are described below. It is noted that the arrows indicating the data transmissions are illustrated between the function units on the memories 21 and 31.

The information processing unit 3 of the computer apparatus is started up in response to the start-up operations by a user (S1). When the information processing unit 3 is started up, the basic BIOS is called. Hereinafter, the descriptions such as "the processor of the information processing unit 3 executes a computer program" mean that "the processor calls a computer program". The basic BIOS 32 performs processes such as the initialization of the processor or the memory 31 and the resource allocation for each device (S2).

Next, the basic BIOS 32 searches for expansion BIOS stored in the storage components on the expansion cards 35 connected with the information processing unit 3 (S3). And the basic BIOS transfers each expansion BIOS detected in S3 to the memory 31 of the information processing unit 3 (S4). One example of the case in which the processes of S3 and S4 are performed is that expansion BIOS performs the control of the expansion cards 35 in order to acquire the information of external apparatus connected with the expansion cards 35. Therefore, when it is configured so that the information of the external apparatus connected with the expansion cards 35 is not acquired, the processes of S3 and S4 are omitted.

Next, the basic BIOS calls the configuration information generating unit 321 (S5). The configuration information generating unit 321 is an example of an acquisition unit. In Example 1, the configuration information is an example of apparatus information. The processor 30 of the information processing unit 3 executes the basic BIOS on the memory 31 as the configuration information generating unit 321. The configuration information generating unit 321 acquires the information of the model, the processor of the information processing unit 3, the chipset and the memory capacity and the like as the information of the computer apparatus 1.

In addition, the configuration information generating unit 321 acquires the information of the vendor IDs, the device IDs, the class codes, the subsystem vendor IDs, subsystem IDs and the like as the information of the expansion cards 35. The information acquired by the configuration information generating unit 321 is an example of first information. Further, for example, the vendor IDs, the device IDs, the class codes, the subsystem vendor IDs, the subsystem IDs and the like, which are acquired as the information of the expansion cards 35, correspond to the configuration or the operation specification of an expansion connection unit.

Further, the configuration information generating unit 321 acquires the external apparatus information which is targeted to be acquired among the information such as the type of the external apparatus and the version of the firmware of the external apparatus and as the information of the external apparatus connected with the expansion cards 35. The information of the external apparatus acquired by the configuration information generating unit 321 is an example of second information. Moreover, the type of the external apparatus, the version of the firmware of the external apparatus and the like correspond to the configuration or the operation specification of the external apparatus (expansion apparatus). Since the computer apparatus 1 acquires the first information and the second information in Example 1, appropriate basic BIOS is determined for the computer apparatus.

The target information to be acquired is for example defined in a computer program executed by the information processing unit 3 as the configuration information generating unit 321. Alternately, the target information to be acquired is for example defined in an external parameter table and the like which is provided for the configuration information generating unit 321. In addition, the configuration information generating unit 321 generates configuration information based on the acquired information. The generated configuration information is stored in the configuration information storing unit 331 of the information processing unit 3. The data flow performed by the configuration information generating unit 321 when the configuration information is acquired is indicated by the arrows in FIG. 6.

Next, the basic BIOS 32 calls the configuration information sending unit 322 (S5). The configuration information sending unit 322 sends the configuration information stored in the configuration information storing unit 331 to the administration maintenance unit 2 via the communication I/F 34. Again, the flow of sending the configuration information from the configuration information sending unit 322 to the administration maintenance unit 2 is indicated by the arrows in FIG. 6.

And then the expansion BIOS receiving unit 323 is called (SA). The expansion BIOS receiving unit 323 receives the expansion BIOS data from the administration maintenance unit 2 via the communication I/F 34. When the administration maintenance unit 2 sends the expansion BIOS data, the expansion BIOS receiving unit 323 stores the received data of the expansion BIOS in the expansion BIOS received data storing unit 332. The flow in which the expansion BIOS data is sent from the administration maintenance unit 2 to the expansion BIOS receiving unit 323 and the flow in which the expansion BIOS data is sent from the expansion BIOS receiving unit 323 to the expansion BIOS received data storing unit 332 are indicated by the arrows in FIG. 6.

Next, the expansion BIOS reading unit 324 is called. For example, a configuration is employed such that when the expansion BIOS receiving unit 323 completes storing the expansion BIOS data in the expansion BIOS received data storing unit 332 the basic BIOS 32 calls the expansion BIOS reading unit 324. The expansion BIOS reading unit 324 searches for the expansion BIOS data stored in the expansion BIOS received data storing unit 332 (SB). And then the expansion BIOS reading unit 324 transfers the expansion BIOS data detected in SB onto the memory 31 of the information processing unit 3. The data flow in which the expansion BIOS reading unit 324 transfers the expansion BIOS data is indicated by the arrows in FIG. 6.

Next, after the processor 30 of the information processing unit 3 performs the initialization, the initial setting and the control of the expansion cards 35 by using the expansion BIOS, the processor 30 boots the OS (SE). The operations of the administration maintenance unit 2 are explained below. At first, the processor 20 of the administration maintenance unit 2 calls the configuration information receiving unit 221. The configuration information receiving unit 221 includes a function of receiving configuration information sent from the information processing unit 3 via the communication I/F 24. When the configuration information receiving unit 221 receives configuration information, the configuration information receiving unit 221 stores the received configuration information in the configuration information storing unit 231 of the administration maintenance unit 2 (S6). The flow in which the configuration information is received by the configuration information receiving unit 221 and stored in the configuration information storing unit 231 is indicated by the arrows in FIG. 6.

Next, the administration maintenance unit 2 calls the expansion BIOS determination unit 223. The expansion BIOS determination unit 223 compares the configuration information stored in the configuration information storing unit 231 with the combination table 232 (S7). The combination table 232 defines the configuration information defining the configuration of the computer apparatus 1, including, for example, the relations between the information of the computer apparatus 1, the information of the expansion cards 35 or the information related to the external apparatus and the appropriate expansion BIOS. And then the expansion BIOS determination unit 223 determines appropriate expansion BIOS according to the configuration (S8). The expansion BIOS determination unit 223 is an example of a determination unit. The processor 30 of the processing unit 3 as the expansion BIOS determination unit 223 executes the basic BIOS on the memory 31.

Next, the processor of the administration maintenance unit 2 calls the expansion BIOS sending unit 224. The expansion BIOS sending unit 224 reads the expansion BIOS data determined by the expansion BIOS determination unit 223 from the storage apparatus 29 of the administration maintenance unit and sends the data to the information processing unit 3 via the communication I/F 24 (S9). The data flow of the expansion BIOS sent from the expansion BIOS sending unit 224 to the information processing unit 3 is indicated by arrows in FIG. 6.

Figure 7:
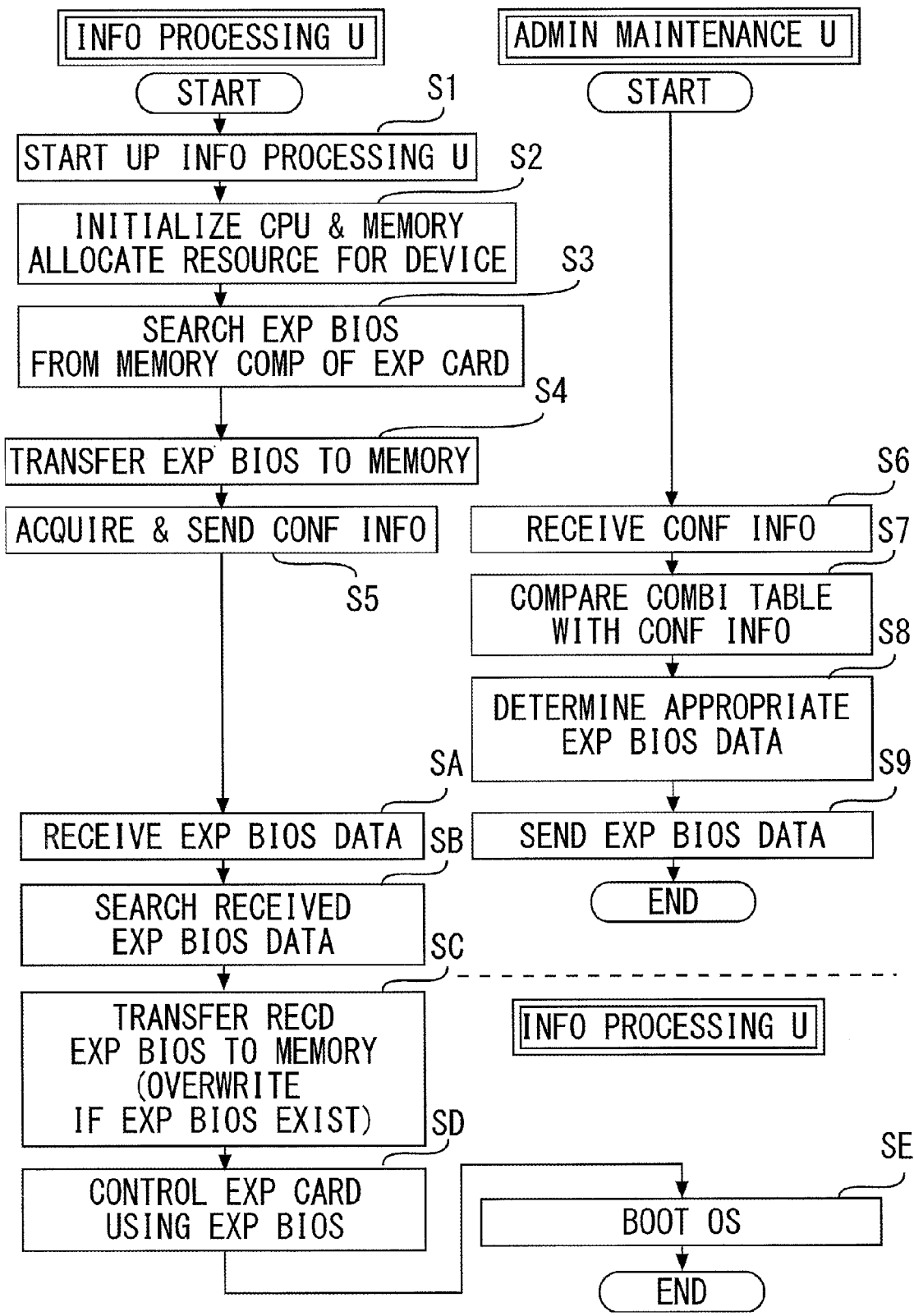
FIG. 7 is a diagram exemplifying an operation flow in the computer apparatus.

As described above, when the operation flows as illustrated in FIGS. 6 and 7 are performed, appropriate expansion BIOS is determined according to the configuration of the computer apparatus 1 and introduced into the information processing unit 3. In addition, in the operation flows as illustrated in FIGS. 6 and 7, the user of the computer apparatus 1 is not aware of which expansion BIOS is the data of the appropriate expansion BIOS. Therefore, in the operation flows as illustrated in FIGS. 6 and 7, the burden on the user is reduced in the administration of the expansion BIOS including considering appropriate expansion BIOS according to the configurations of the devices in the computer apparatus 1 and rewriting the expansion BIOS data in the storage components on the expansion cards 35 with appropriate data.

For example, it is assumed here that the user adds the expansion cards 35 or the external apparatus 4 after the computer apparatus 1 is introduced or the user introduces another expansion card or another external apparatus instead of the existing expansion cards 35 or the existing external apparatus 4. Even when the user changes the configurations of the expansion cards 35 or the external apparatus 4 after the computer apparatus 1 is introduced in this assumption, the configuration information receiving unit 221 receives the configuration information of the information processing unit 3, the expansion BIOS determination unit 223 determines appropriate expansion BIOS according to the combination table 232 and the expansion BIOS sending unit 224 passes the appropriate BIOS data stored in the storage apparatus 29 to the information processing unit 3 in the computer apparatus 1 in Example 1. Thus, when the user changes the configurations of the expansion cards 35 and the external apparatus 4 after the computer apparatus 1 is introduced, the information processing unit 3 executes the appropriate expansion BIOS to control the expansion cards 35 and the external apparatus 4 by the processes performed by the computer apparatus 1. Therefore, the burdens on the user accompanied by changing the expansion cards 35 and the external apparatus 4 are reduced.

Thus, computer apparatus may be configured to update the expansion BIOS data and the combination table 232 stored in the storage apparatus 29. In addition, the update process may be performed according to the user's update instruction. Alternatively, the update process may be performed by use of the change of the expansion card 35 or the external apparatus 4 as a trigger.

Example 2

Configurations

Figure 8:
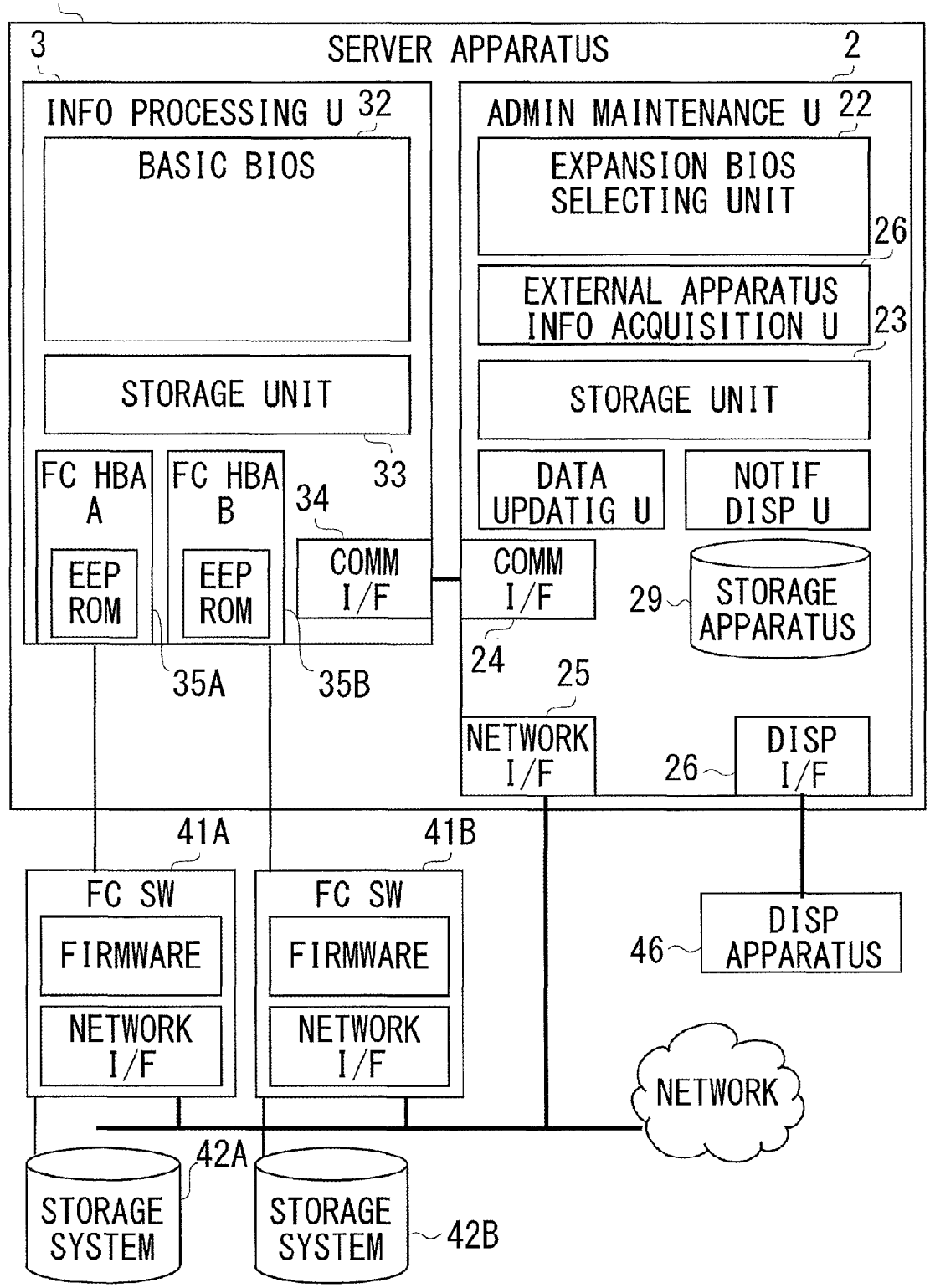
FIG. 8 is a diagram exemplifying the configuration of an information system according to example 2.

FIG. 8 illustrates a configuration diagram of an information system according to Example 2. The present information system includes a server apparatus 1A, Fibre Channel Switches (FC SW) 41A and 41B connected with the server apparatus 1A, storage systems 42A and 42B connected with the FC SWs 41A and 41B and a display apparatus 46. In addition, the server apparatus 1A includes an information processing unit 3 and an administration maintenance unit 2. Thus, in Example 2, FC SWs 41A and 41B and storage systems 42A and 42B are exemplified as the external apparatus 4 in Example 1. FC SWs 41A and 41B are examples of an expansion apparatus.

Further, the information processing unit 3 includes a memory including basic BIOS 32 and a storage unit 33, Fibre Channel Host Bus Adapters (FC HBA) 35A and 35B and a communication I/F 34. In Example 2, the information processing unit 3 in Example 1 includes FC HBAs 35A and 35B as the expansion cards 35 in Example 1. The details of the configuration of the information processing unit 3 are described with reference to FIG. 9 later.

Additionally, the administration maintenance unit 2 includes an expansion BIOS selecting unit 22, an external apparatus information acquisition unit 26, a computer program functioning as a data updating unit and a notification display unit and a storage unit 23 on the memory. Moreover, the administration maintenance unit 2 includes a communication I/F 24, a storage apparatus 29, a network I/F 25 and a display I/F 26. The display I/F 26 is connected with the display apparatus 46.

In addition, the administration maintenance unit 2 is connected with FC SWs 41A and 41B via the network I/F 25. In Example, the information processing unit acquires the information regarding the external apparatus 4 as a part of the configuration information via the expansion cards 35. On the other hand, the external apparatus information acquisition unit 26 of the administration maintenance unit 2 acquires the information regarding FC SWs 41A and 41B, which correspond to the external apparatus 4 in Example 1. It is noted that the details of the configuration of the administration maintenance unit 2 are described with reference to FIG. 11 later.

The display apparatus 46 is, for example, a liquid crystal display, an electroluminescence panel, a plasma display or a Cathode Ray Tube (CRT) display and the like. In addition, the display I/F 26 is an interface provided between the processor 20 and the chipset of the administration maintenance unit 2 and the display apparatus.

The details of the configurations of the information processing unit 3, the administration maintenance unit 2, FC HBAs 35A and 35B and FC SWs 41A and 41B are exemplified below. It is noted that FC HBAs 35A and 35B are comprehensively referred to as FC HBA 35. However, the number of FC HBA 35 is not limited to two in the information system in Example 2. Similarly, FC SWs 41A and 41B are comprehensively referred to as FC SW 41. However, the number of FC SW 41 is not limited to two in the information system in Example 2.

Figure 9:
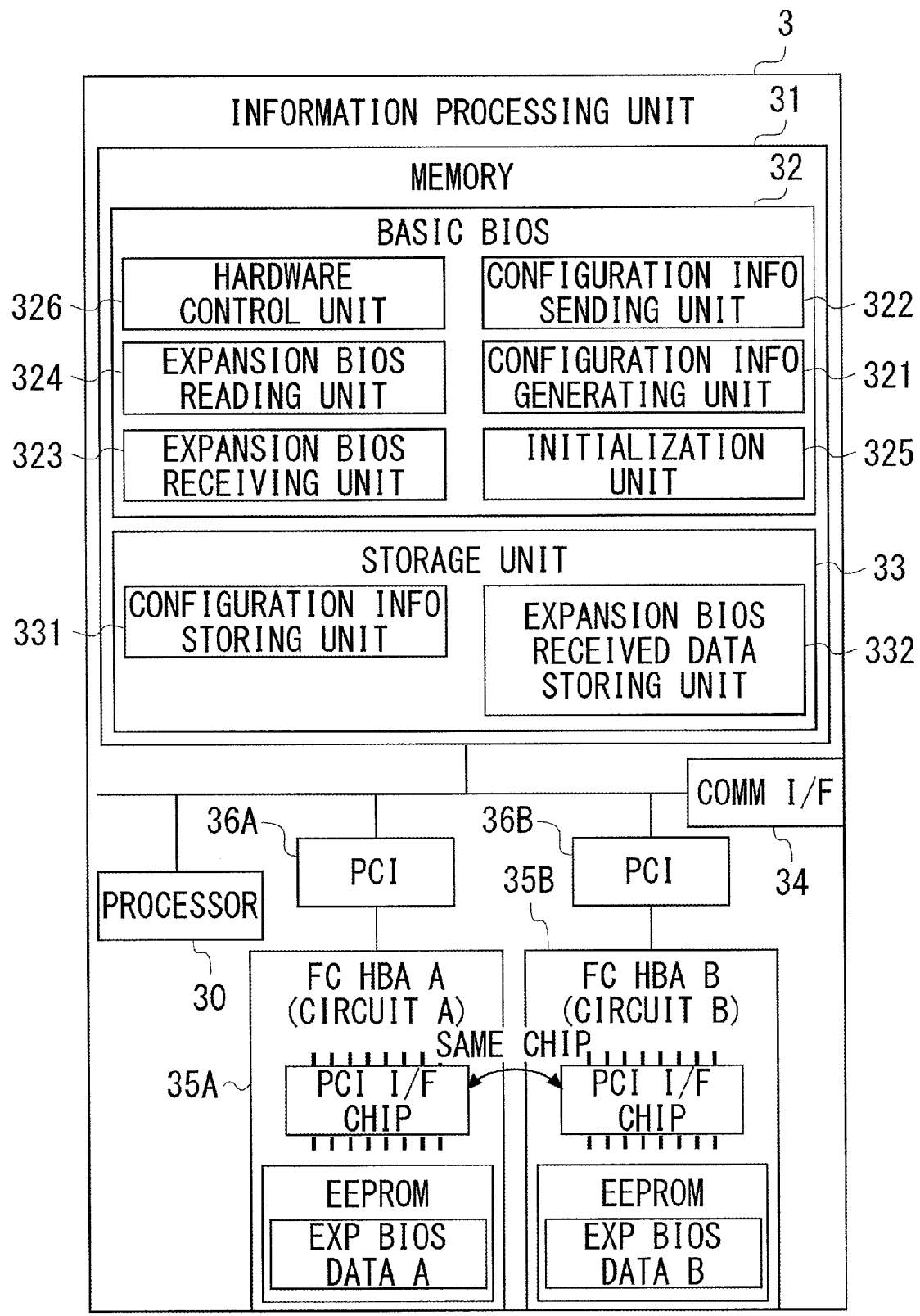
FIG. 9 is a diagram exemplifying the configuration of an information processing unit.

FIG. 8 illustrates a configuration diagram of the information processing unit 3. As illustrated in FIG. 9, the information processing unit 3 in the server apparatus 1A includes a processor 30, a memory 31 and PCI bus interfaces 36A and 36B in order to achieve the functions of the information processing unit 3. The processor 30, the memory 31 and the PCI bus interfaces 36A and 36B are connected via an internal bus. The PCI bus interfaces 36A and 36B are examples of the interface 36 in Example 1. PCI bus interfaces 36A and 36B provide connection functions using a PCI bus. An expansion card connected with the PCI bus is referred to as a PCI expansion card. In Example 2, the PCI expansion card is used as an example of an expansion connection unit.

The PCI bus interfaces 36A and 36B are connected with FC HBA 35A and FC HBA 35B as PCI expansion cards. FC HBA 35A and FC HBA 35B are examples of the expansion cards in Example 1. FC HBA 35A and FC HBA 35B are also examples of the expansion connection unit. In addition, the combination of FC HBA 35A and FC SW 41A is an example of the connection apparatus. Similarly, the combination of FC HBA 35B and FC SW 41B is an example of the connection apparatus. Moreover, the information processing unit 3 includes the communication I/F 34 for communicating with the administration maintenance unit 2.

Further, similar to Example 1, the information processing unit 3 includes an area for storing the basic BIOS 32 and a storage unit 33 on the memory 31. The basic BIOS 32 includes an initialization unit 325, a configuration information generating unit 321, a configuration information sending unit 322, an expansion BIOS receiving unit 323, an expansion BIOS reading unit 324 and a hardware control unit 326.

The initialization unit 325 performs initial diagnoses, initializations and resource allocations for the hardware and the like for the processor 30 and the memory 31 included in the information processing unit 3. The configuration information generating unit 321 generates configuration information based on the information of respective hardware included in the server apparatus 1A. However, in contrast to Example 1, the configuration information generating unit 321 does not add the information of FC SW 41, which is an example of the external apparatus 4, to the configuration information. The configuration information generating unit 321 can be an example of a first acquisition unit. The processor 30 of the information processing unit 3 as the configuration information generating unit executes the basic BIOS 32 on the memory 31.

The hardware control unit 326 uses the expansion BIOS stored in the memory 31 by the expansion BIOS reading unit 324 to perform the device-dependent initialization and the device-dependent setting for each PCI expansion card and the control of the hardware. In addition, the configuration information sending unit 322, the expansion BIOS receiving unit 323 and the expansion BIOS reading unit 324 include functions similar to the functions in Example 1.

In Example 2, it is assumed that FC HBAs 35A and 35B are manufactured by the same vendor. In addition, it is assumed that FC HBA 35B is newer than FC HBA 35A. Further, the PCI I/F chips installed in FC HBAs 35A and 35B are identical. It is noted that FC HBAs 35A and 35B using the PCI I/F chips communicate with the information processing unit 3 via the PCI bus and communicate with the external apparatus connected with FC HBAs 35A and 35B such as FC SWs 41A and 41B.

FC HBAs 35A and 35B includes non-volatile storage apparatus such as EEPROM. The EEPROMs of FC HBAs 35A and 35B store the expansion BIOS A data and the expansion BIOS B data, respectively.

It is assumed that the expansion BIOS A is not compliant with the control of FC HBA 35B, which is a newer product. To the contrary, it is assumed that the expansion BIOS B is compliant with the controls of both FC HBA 35A and FC HBA 35B. In addition, it is assumed in the descriptions of Example 2 below that a vendor assures that expansion BIOS C is compliant with the controls of both FC HBA 35A and FC HBA 35B and is able to properly communicate with FC SW 41. Therefore, when the expansion BIOS C is used, the server apparatus 1A operates normally.

Figure 10:
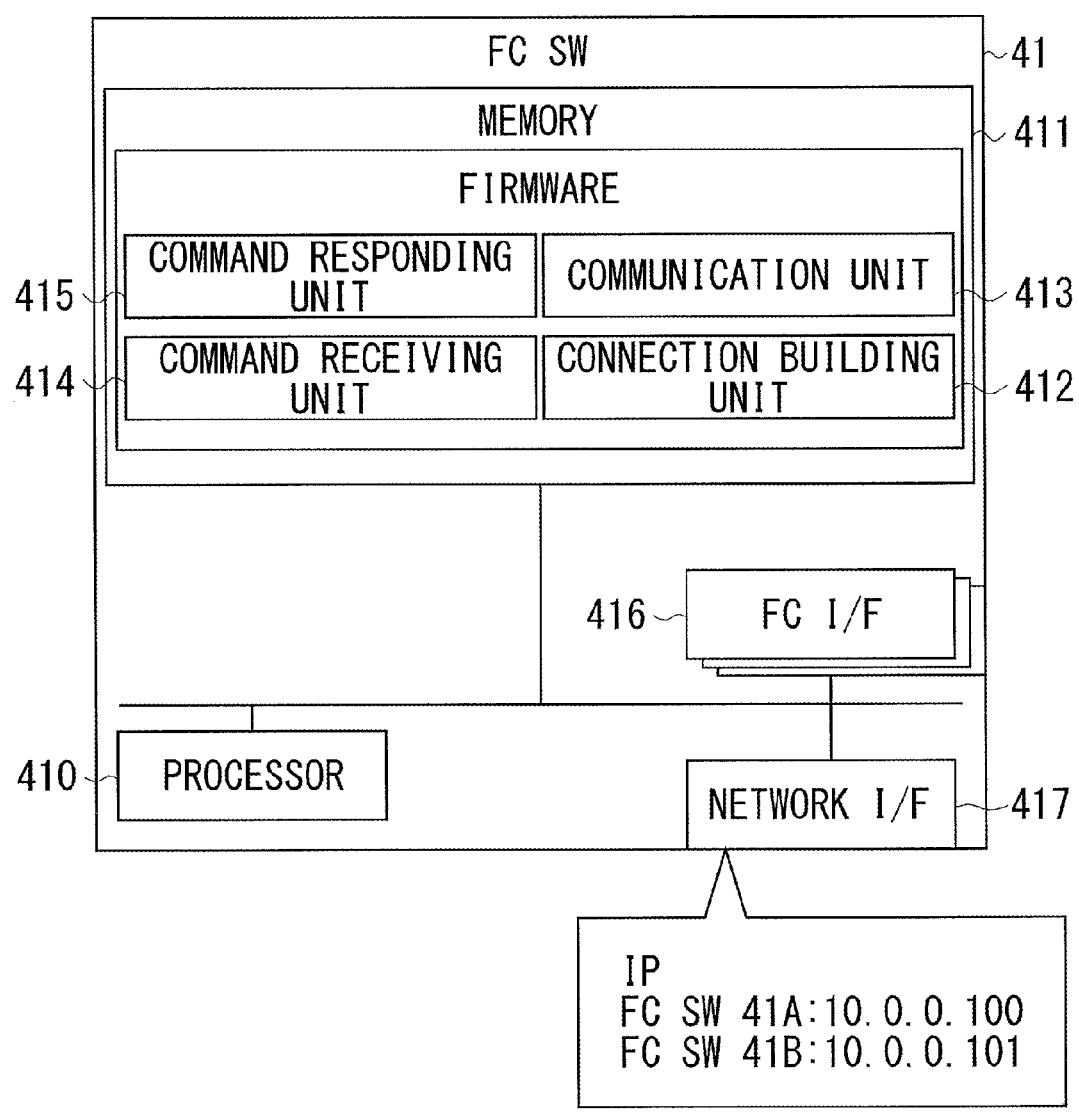
FIG. 10 is a diagram exemplifying the configuration of an FC SW.

FIG. 10 exemplifies the configuration of FC SW 41. FC SW 41 includes an independent processor 410 and an independent memory 411 with which FC SW 41 operates and FC SW 41 is controlled by the firmware of FC SW 41. Plural fibre channel interfaces (hereinafter, referred to as FC I/F 416) are installed in FC SW 41. In addition, a network interface (hereinafter, referred to as network I/F 417) is installed in FC SW 41. FC SW 41 is connectable with a network via LAN (Local Area Network). In Example 2, it is assumed for example that an IP address "10.0.0.100" is allocated to FC SW 41A and an IP address "10.0.0.101" is allocated to FC SW 41B.

Moreover, the firmware of FC SW 41 includes a connection building unit 412, a communication unit 413, a command receiving unit 414 and a command responding unit 415. The connection building unit 412 establishes connections with FC HBAs and the storage system 42.

The communication unit 413 communicates with FC HBAs and the storage system 42. The command receiving unit 414 receives commands via the network I/F 417. The command responding unit 415 responds to the commands via the network I/F 417. In Example 2, when the command receiving unit 414 receives an "inquiry" command, the command responding unit 415 sends the device information of FC SW 41.

Figure 11:
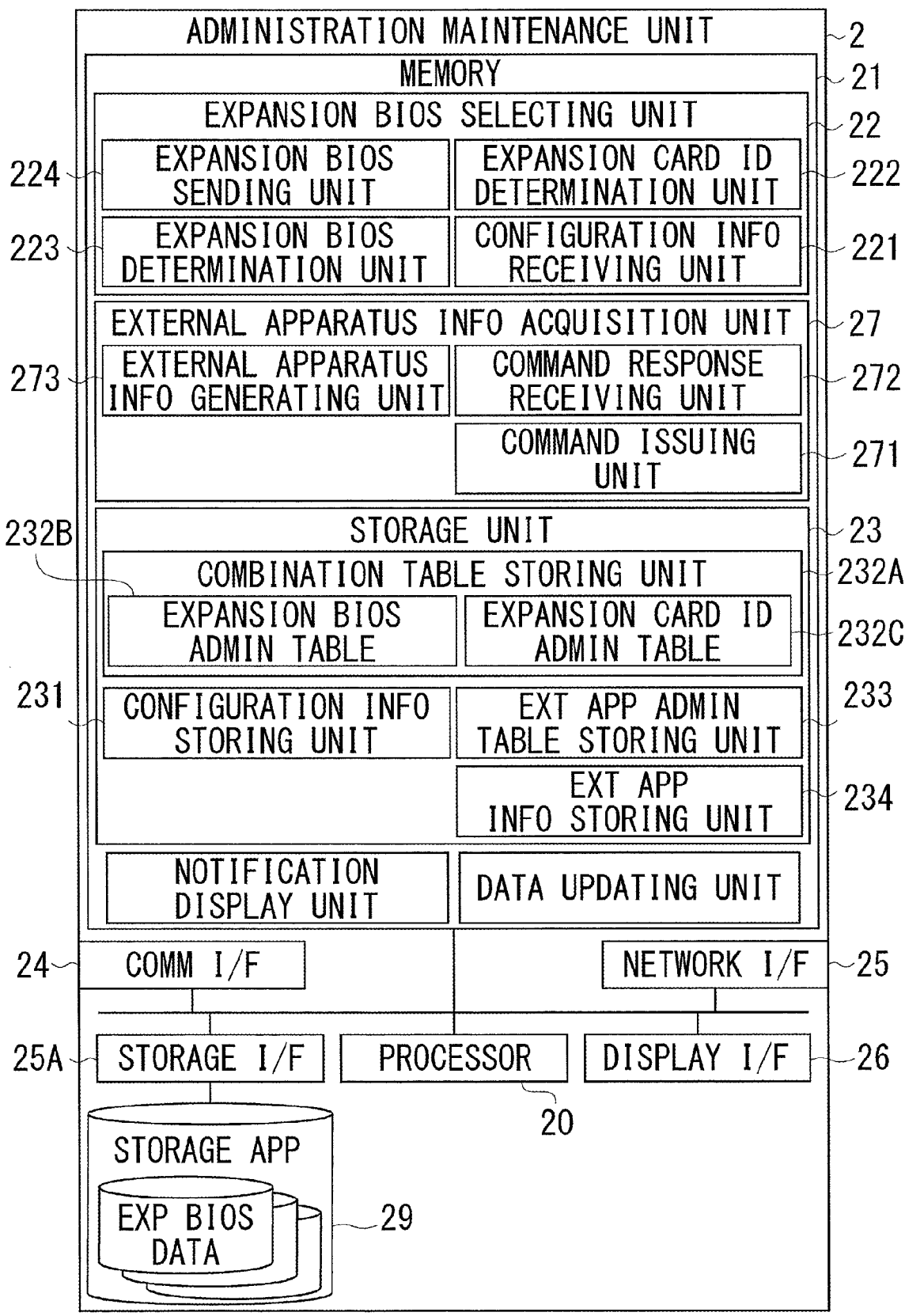
FIG. 11 is a diagram exemplifying the configuration of a administration maintenance unit.

FIG. 11 exemplifies a configuration diagram of the administration maintenance unit 2. The administration maintenance unit 2 includes a processor 20 and a memory 21 with which the administration maintenance unit 2 operates. In addition, the administration maintenance unit 2 includes a communication I/F 24 for communicating with the information processing unit 3, a display interface (hereinafter, display I/F 26) for connecting with a display apparatus 46 (see FIG. 8) and a network I/F 25 for connecting with the network via LAN. The administration maintenance unit 2 is connected with a storage apparatus 29 via a storage interface (hereinafter, storage I/F 25A). The storage apparatus 29 is for example a flash memory. The storage apparatus 29 stores the data of a plurality of expansion BIOS. The data of the plurality of expansion BIOS includes expansion BIOS C, of which the vendor assures the operation and with which FC HBA 35A and FC HBA 35B are controlled and a wait time for FC SW 41 connected as an external apparatus is set to 600 ms, for example.

The administration maintenance unit 2 stores a computer program for making the processor 20 function as an expansion BIOS selecting unit 22, an external, apparatus information acquisition unit 27, a notification display unit and a data updating unit in an area in the memory 21. In addition, the administration maintenance unit 2 includes a storage unit 23 in the memory 21.

The storage unit 23 stores a variety of information administered by the administration maintenance unit 2 such as the information on the information processing unit 3 for administering and maintaining the information processing unit 3. For example, the storage unit 23 stores an expansion BIOS administration table 232B and an expansion card identifier administration table 232C in a combination table storing unit 232A. The expansion BIOS administration table 232B and the expansion card identifier administration table 232C in the combination table storing unit 232A are referred to as a combination table. The details of the expansion BIOS administration table 232B are described with reference to FIG. 28 later. Further, the details of the expansion card identifier administration table 232C are described with reference to FIG. 26 later.

Additionally, the storage unit 23 includes a configuration information storing unit 231 for storing the configuration information of the information processing unit 3, an external apparatus administration table storing unit 233 for storing external apparatus administration tables and an external apparatus information storing unit 234 for storing the information of external apparatus connected with FC HBA of the information processing unit 3. The details of the configuration information are described with reference to FIG. 14 later. In addition, the details of the external apparatus administration table are described with reference to FIG. 20 later. Further, the details of the external apparatus information are described with reference to FIG. 23 later.

(External Apparatus Information Acquisition Unit)

Next, the functions of the external apparatus information acquisition unit 27 are described below. The external apparatus information acquisition unit 27 uses a command issuing unit 271, a command response receiving unit 272 and an external apparatus information generating unit 273 to generate external apparatus information from the information of external apparatus (for example, FC SW 41 in FIG. 8) acquired via the communication I/F 24. The external apparatus information acquisition unit 27 is an example of a second acquisition unit. The processor 20 of the administration maintenance unit 2 functions as the external apparatus information acquisition unit 27 to execute the computer program on the memory 21.

The command issuing unit 271 issues apparatus information inquiry commands to the external apparatus described in the external apparatus administration table via the network I/F 25. The command response receiving unit 272 receives the results of the responses to the apparatus information inquiry commands from the external apparatus via the network I/F 25. The external apparatus information generating unit 273 generates the external apparatus information from the command response results. The external apparatus information generating unit 273 stores the generated external apparatus information in the external apparatus information storing unit 231.

(Expansion BIOS Selecting Unit)

Each function of the expansion BIOS selecting unit 22 is described below. The expansion BIOS selecting unit 22 uses a configuration information receiving unit 221, an expansion card identifier determination unit 222, an expansion BIOS determination unit 223 and an expansion BIOS sending unit 224 to select appropriate expansion BIOS for the configuration information of the server apparatus LA and the information of the external apparatus and provide the information for the information processing unit 3. The expansion BIOS selecting unit 22 uses the configuration information acquired by the configuration information generating unit 321 as a first acquisition unit and the external apparatus information acquired by the external apparatus information acquisition unit 27 as a second acquisition unit to select appropriate expansion BIOS.

The configuration information receiving unit 221 receives via the communication I/F 24 the configuration information of the server apparatus LA sent from the information processing unit 3. The configuration information receiving unit 221 may be regarded as an example of the first acquisition unit. The processor 20 of the administration maintenance unit 2 functions as the configuration information receiving unit 221 to execute the computer program on the memory 21.

The expansion card identifier determination unit 222 checks the received configuration information of the server apparatus 1A with the expansion card identifier administration table 232C in the combination table storing unit 232A to determine an expansion card identifier.

The expansion BIOS determination unit 223 uses the external apparatus information acquired by the external apparatus information acquisition unit 27 and the configuration information received by the configuration information receiving unit 221 to determine the data of appropriate expansion BIOS. The expansion BIOS determination unit 223 is an example of a determination unit. The processor 20 of the administration maintenance unit 2 functions as the expansion BIOS determination unit 223 to execute the computer program on the memory 21.

That is, the expansion BIOS determination unit 223 refers to the expansion BIOS administration table 232B in the combination table storing unit 232A based on the combination of the external apparatus information, the configuration information and the expansion card identifier to determine the data of appropriate expansion BIOS. The expansion BIOS sending unit 224 reads the determined expansion BIOS data from the storage apparatus 29 of the administration maintenance unit 2 and sends the determined data to the information processing unit 3 via the communication I/F 24.

(Other Functional Units)

The notification display unit displays a variety of information on the display apparatus 46 via the display I/F 26. The information to be displayed includes the configuration information of the server apparatus 1A, the information of the external apparatus and notifications generated when appropriate expansion BIOS corresponding to the configuration of the server apparatus 1A cannot be determined.

The data updating unit acquires the expansion BIOS administration table 232B and the expansion card identifier administration table 232C from the computers, the servers and the like on the network via the network I/F 25 and stores the acquired table in the combination table storing unit 232A. In addition, the data updating unit acquires the expansion BIOS data and the like from the computers, the servers and the like on the network via the network I/F 25 and stores the acquired data in the storage apparatus 29. For example, the data updating unit acquires at a predetermined timing the expansion BIOS administration table 232B, the expansion card identifier administration table 232C and the expansion BIOS data from a server on the network which is provided by a vendor such as the vendor of the server apparatus 1A or the vendor of the PCI expansion card. The predetermined timing includes a predetermined time period, timing when an instruction is issued by the user's operations or timing when the configuration of the server apparatus 1A is changed or the PCI expansion card is changed or added.

<Process Flow>

The processor 30 of the information processing unit 3 functions as a initialization unit 325, a configuration information generating unit 321, a configuration information sending unit 322, an expansion BIOS receiving unit 323, an expansion BIOS reading unit 324 and a hardware control unit 326 to execute the basic BIOS on the memory 31. In Example 2, at first, the information processing unit 3 of the server apparatus 1A is not turned on, and the administration maintenance unit 2 and FC SWs 41A and 41B are turned on.

Figure 12:
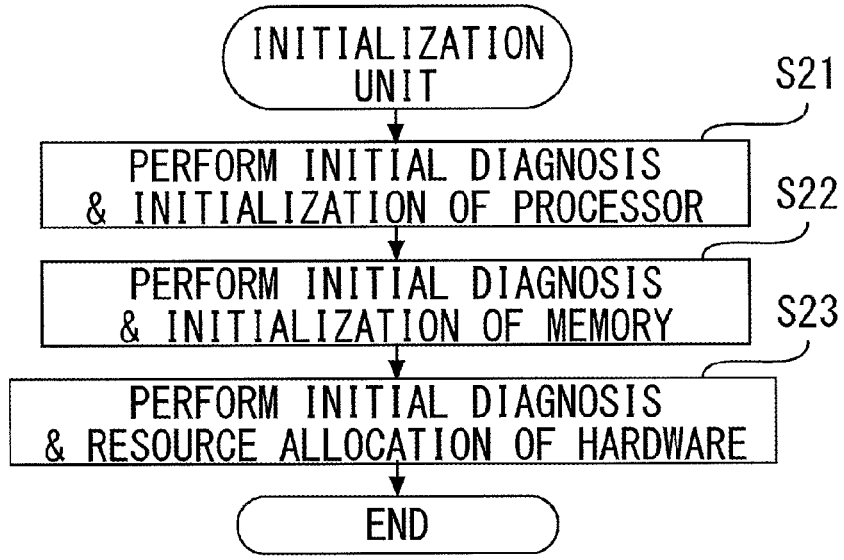
FIG. 12 is a diagram exemplifying a flow of processes performed in an initialization unit.

FIG. 12 exemplifies a process flow performed by the initialization unit 325. After the information processing unit 3 is turned on, the initialization unit 325 of the basic BIOS 32 is called for performing the processes as illustrated in FIG. 12. At first, the initialization unit 325 executes an initial diagnosis of the processor of the information processing unit 3 (S21), and an initial diagnosis and an initialization of the memory of the information processing unit 3 (S22). Next, the information processing unit 3 executes initial diagnoses and resource allocations of various types of hardware in the information processing unit 3 (S23). Here, in the resource allocations, areas in the memory 31 are allocated to various types of hardware to use the areas in the memory 31 as registers for example.

FIG. 12 exemplifies a process flow performed by the configuration information generating unit 321. The configuration information generating unit 321 collects information of the hardware configuration of the server apparatus 1A and generates configuration information. At first, the configuration information generating unit 321 acquires the model information of the server apparatus 1A (S51). The model information of the server apparatus 1A is stored in a ROM and the like of the information processing unit 3 for example. Next, the configuration information generating unit 321 acquires the information of the configurations of the processor 30 and the memory 31 of the information processing unit 3, the information of the chipset and the like (S52). The information acquired in S51 and S52 is referred to as server information.

Next, the configuration information generating unit 321 acquires the vendor IDs, the device IDs, the class codes, the subsystem vendor IDs and the subsystem IDs of FC HBAs 35 (S53). The information of FC HBAs 35 can be acquired by calling configuration registers. The configuration register is allocated to a part of the physical address space of the information processing unit 3 for the input/output processes. The configuration information generating unit 321 sets predetermined values to the configuration registers for instructing the acquisitions of the information of FC HBAs 35. And then FC HBAs 35 outputs the own information to the configuration registers for outputting the information. Next, the configuration information generating unit 321 generates the configuration information as illustrated in FIG. 14 (S54). The configuration information generating unit 321 stores the generated configuration information in the configuration information storing unit 331.

FIG. 14 illustrates an example of the data of the configuration information. In the example in FIG. 14, the configuration information includes the server information and the expansion card information. In addition, the server information includes the model information, the CPU information, the chipset information and the memory information. Further, the model information includes the information for determining the server manufacturer, the information for determining the model and the serial number. The memory information is the information of the memory capacity and the like for example.

The expansion card information includes the vendor IDs, the device IDs, the class codes, subsystem vendor IDs and subsystem IDs of the expansion cards connected with the server apparatus 1A.

Figure 15:
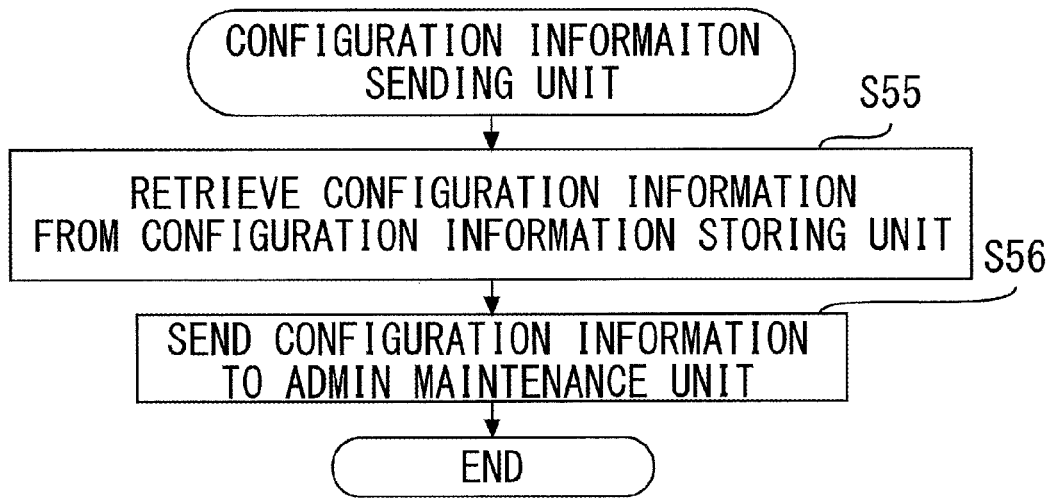
FIG. 15 is a diagram exemplifying processes performed by a configuration information sending unit.

FIG. 15 exemplifies processes performed by the configuration information sending unit 322. The configuration information sending unit 322 retrieves the configuration information stored in the configuration information storing unit 331 (S55). And the configuration information sending unit 322 sends the configuration information to the administration maintenance unit 2 via the communication I/F 34 (S56).

Figure 16:
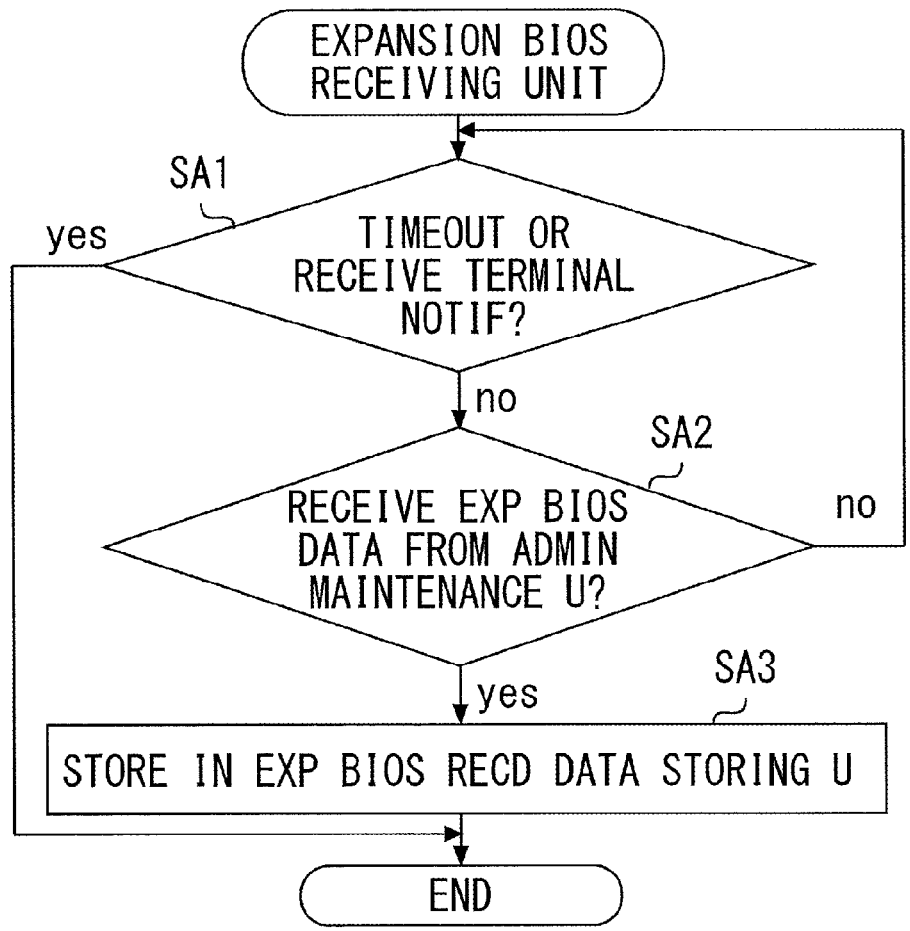
FIG. 16 is a diagram exemplifying processes performed by an expansion BIOS receiving unit.

FIG. 16 exemplifies processes performed by the expansion BIOS receiving unit 323. The expansion BIOS receiving unit 323 includes a function for receiving the expansion BIOS data sent from the administration maintenance unit 2. When the expansion BIOS receiving unit 323 is started up, the expansion BIOS receiving unit 323 waits for the expansion BIOS data sent from the administration maintenance unit 2 until a predetermined time-out value is reached (SA1).

When the expansion BIOS data is received (SA2: Y), the expansion BIOS receiving unit 323 stores the sent expansion BIOS data in the expansion BIOS received data storing unit 332 (SA3). When the expansion BIOS data is not sent from the administration maintenance unit 2 until the time-out value is reached or when the expansion BIOS receiving unit 323 receives a sending completion notification from the administration maintenance unit 2 (SA1: Y), the expansion BIOS receiving unit 323 terminates the processes. With the processes as described above performed, when the expansion BIOS data is sent from the administration maintenance unit 2 before the time-out value is reached, the received expansion BIOS data is stored in the expansion BIOS received data storing unit 332.

Figure 17:
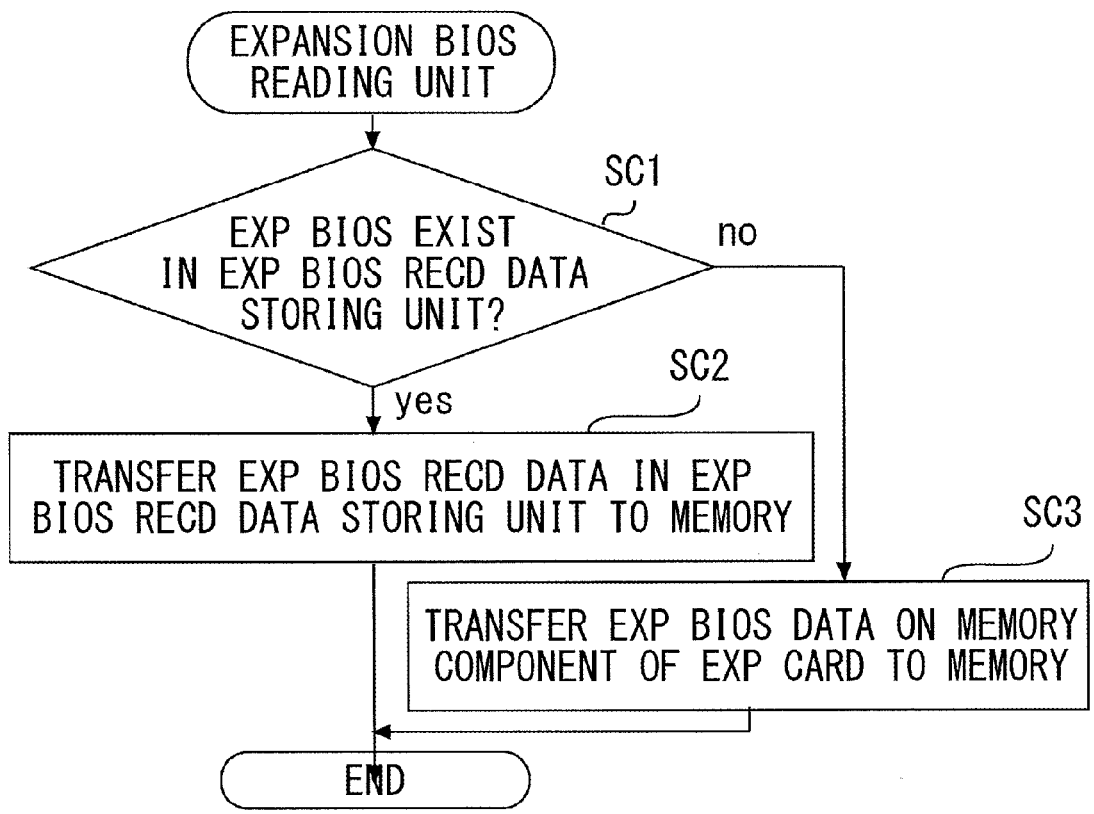
FIG. 17 is a diagram exemplifying processes performed by an expansion BIOS reading unit.

FIG. 17 exemplifies processed performed by the expansion BIOS reading unit 324. The expansion BIOS reading unit 324 is started up after the processes performed by the expansion BIOS receiving unit are terminated. The expansion BIOS reading unit 324 transfers the expansion BIOS data stored in the expansion BIOS received data storing unit 332 to the memory 31 of the information processing unit 3.

After the expansion BIOS reading unit 324 is started up, the expansion BIOS reading unit 324 searches for the expansion BIOS data stored in the expansion BIOS received data storing unit 332. When the expansion BIOS data is stored in the expansion BIOS received data storing unit 332 (SC1: Y), the expansion BIOS reading unit 324 transfers the searched expansion BIOS data to the memory 31 (SC2). When the expansion BIOS data is not stored in the expansion BIOS received data storing unit 332 for reasons such that the processes performed by the expansion BIOS receiving unit 323 are timed out, the expansion BIOS reading unit 324 transfers the expansion BIOS data stored in the storage component of the expansion card to the memory of the information processing unit 3 (SC3). With the processes as described above performed, when the expansion BIOS C data is stored in the expansion BIOS received data storing unit 332, appropriate expansion BIOS is transferred to the memory 31.

Figure 18:
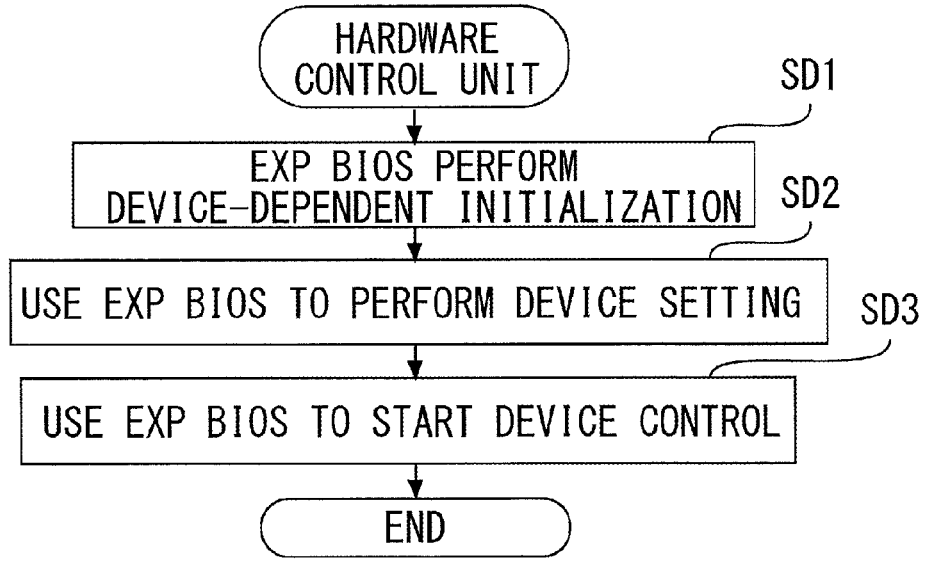
FIG. 18 is a diagram exemplifying processes performed by a hardware control unit.

FIG. 18 exemplifies processes performed by the hardware control unit 326. The hardware control unit 326 includes a function for controlling hardware using expansion BIOS. The hardware control unit 326 uses expansion BIOS on the memory 31 to perform device-dependent initializations to expansion cards (SD1). The device-dependent initializations include initializations which are unique to respective expansion cards such as clearance processes and initial value settings of registers of FC HBAs 35.

Next, the hardware control unit 326 performs device settings to the expansion cards (SD2). The device settings to the expansion cards include settings which are unique to respective expansion cards such as connection settings between FC HBAs 35 and PCI buses.

Then, the hardware control unit 326 starts the device controls of the expansion cards using the expansion BIOS (SD3). With the above processes performed, PC HBA 35A and FC HBA 35B are controlled by the expansion BIOS. For example, time-out determinations are made according to the response wait time and the like set in the expansion BIOS.

Next, processes performed by the administration maintenance unit 2 are described. Here, processes for acquiring external apparatus information and processes for selecting expansion BIOS are described as examples among the processes performed by the administration maintenance unit 2. At first, the processes for acquiring external apparatus information are described. The processes for acquiring external apparatus information are performed by the external apparatus information acquisition unit 27. The administration maintenance unit 2 periodically calls the external apparatus information acquisition unit 27 in order to keep the external apparatus information the latest. The external apparatus information acquisition unit 27 includes a command issuing unit 271, a command response receiving unit 272 and an external apparatus information generating unit 273.

Figures 19, 20:
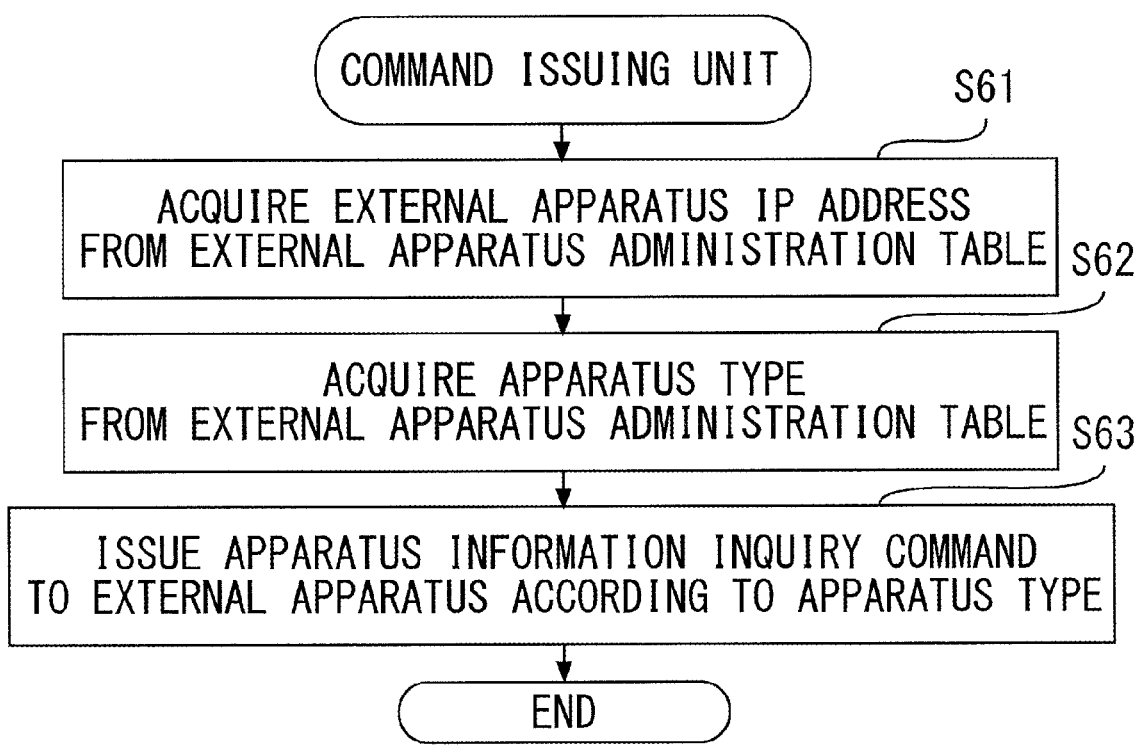
FIG. 19 is a diagram exemplifying processes performed by a command issue unit.
FIG. 20 is a diagram exemplifying an external apparatus administration table.

FIG. 19 exemplifies processes performed by the command issuing unit 271. The command issuing unit 271 refers to IP addresses and external apparatus types described in an external apparatus administration table (see FIG. 20) (S61 and S62). And then the command issuing unit 271 issues apparatus information inquiry commands to the external apparatus (S63). In Example 2, it is assumed that the external apparatus types of FC SWs 41A and 41B as illustrated in FIG. 20 are "FCSW-012" together. For example, when the apparatus information inquiry command regarding "FCSW-012" is "inquiry", the command issuing unit 271 issues an "inquiry" command to 10.0.0.100 and 10.0.0.101 respectively.

It is noted that the command issuing unit 271 may refer to IP addresses in the external apparatus administration table based on the external apparatus types in a computer program and issue apparatus information inquiry commands. In addition, the command issuing unit 271 may refer to sequentially refer to IP addresses described in the external apparatus administration table to issue apparatus information inquiry commands.

FIG. 20 illustrates an example of data stored in the external apparatus administration table. One row in the table in FIG. 20 denotes one record. One record in the external apparatus administration table includes for example an Internet Protocol (P) address and information for determining the external apparatus type.

Figure 21:
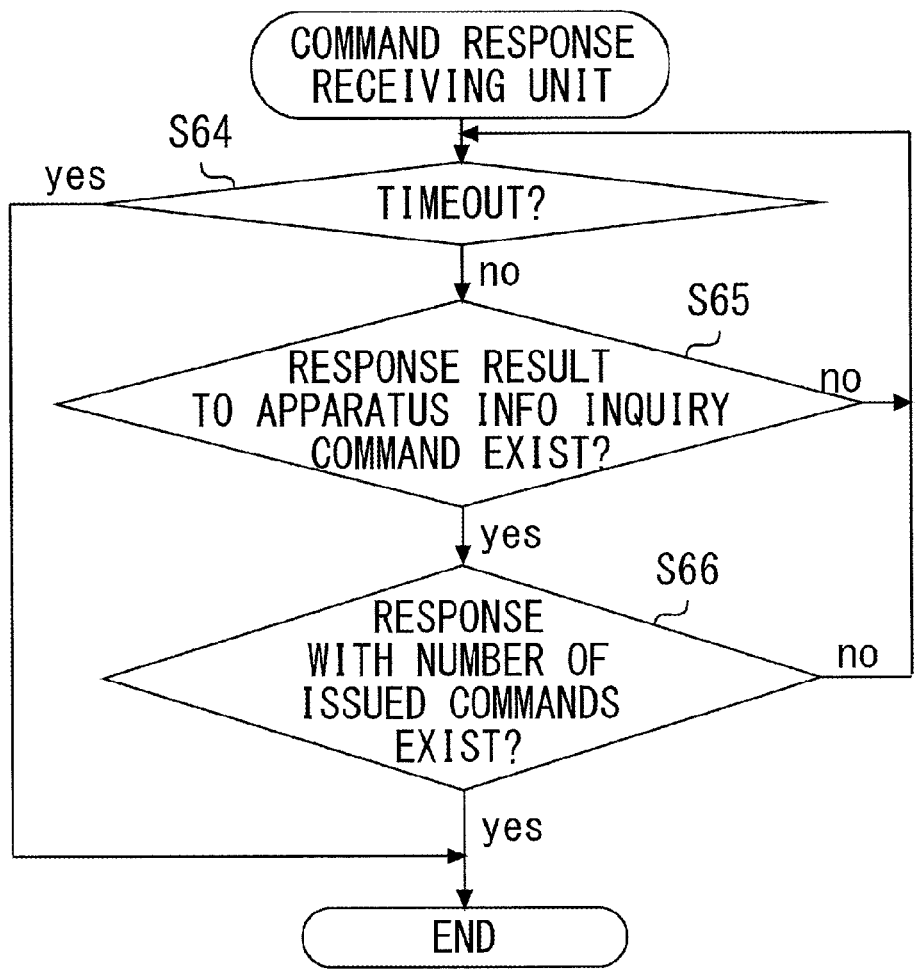
FIG. 21 is a diagram exemplifying a command response receiving unit.

FIG. 21 exemplifies processes per formed by the command response receiving unit 272. The command response receiving unit 272 waits for the results of the responses to the apparatus information inquiry commands from the external apparatus until the time-out value is reached (until the result in S64 becomes Y) (S65). The command issuing unit 272 terminates the processes when responses are received corresponding to the number of generated commands or the time-out occurs (S66: Y).

Figure 22:
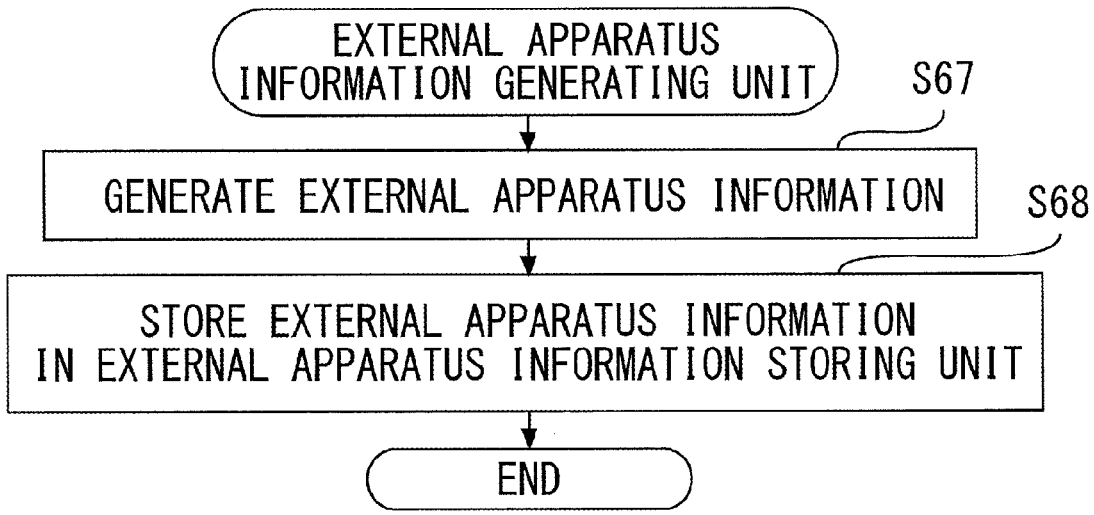
FIG. 22 is a diagram exemplifying an external apparatus information generating unit.
Figures 23, 24:
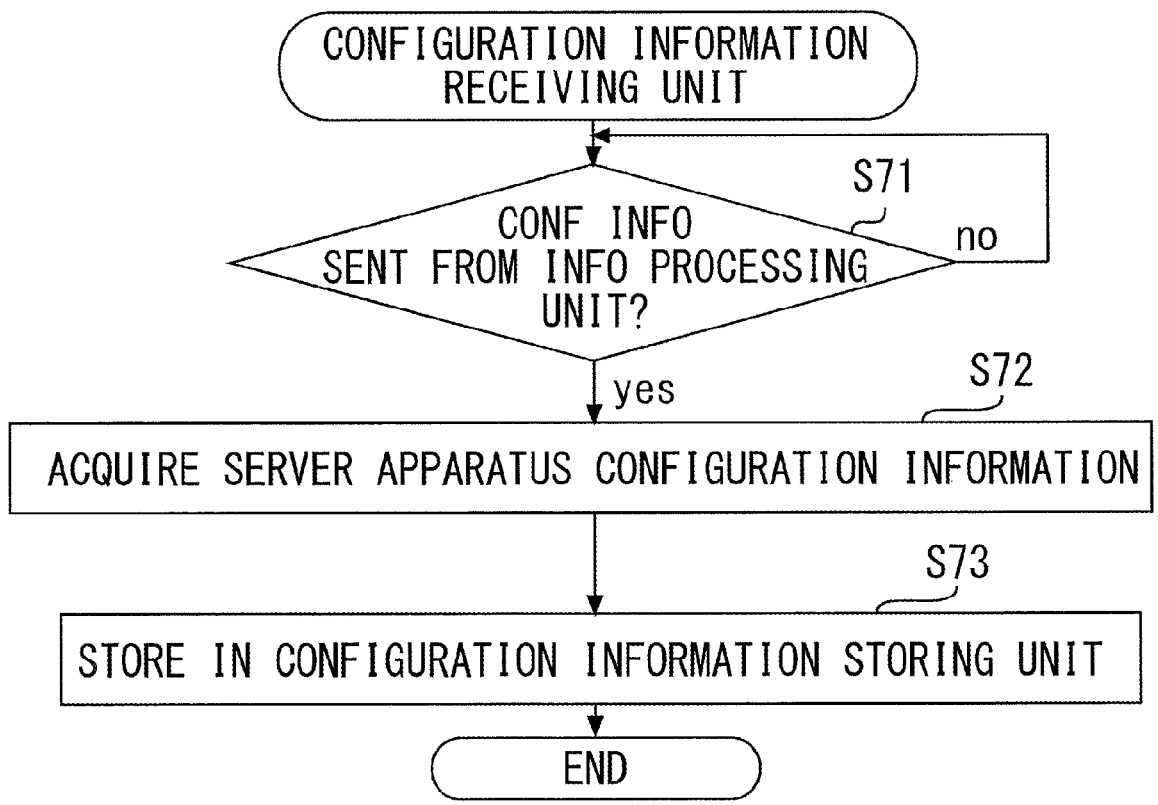
FIG. 23 is a diagram exemplifying external apparatus information.
FIG. 24 is a diagram exemplifying processes performed by a configuration information receiving unit.

FIG. 22 exemplifies processes performed by the external apparatus information generating unit 273. The external apparatus information generating unit 273 generates the external apparatus information (see FIG. 23) from the results of the responses to the apparatus information inquiry commands received by the command response receiving unit 272 (S67). The external apparatus information generating unit 273 stores the generated external apparatus information in the external apparatus information storing unit 234 (S68). With the above processes performed, the external apparatus information as illustrated in FIG. 23 is acquired when FC SWs 41 send vendor names, model numbers and firmware (W) versions as the external apparatus information. In the example in FIG. 23, each external apparatus holds an IP address, a vendor name, a model number and a firmware (FW) version as the external apparatus information. In addition, the example in FIG. 23 illustrates that there are responses within the time-out value from the external apparatus of which the IP addresses are 10.0.0.100 and 10.0.0.101.

Next, the processes performed by the expansion BIOS selecting unit 22 are described. The processes performed by the expansion BIOS selecting unit 22 are initiated for example when the expansion BIOS selecting unit 22 receives the configuration information from the information processing unit 3 or when the external apparatus information acquisition unit 27 stores the external apparatus information in the external apparatus information storing unit 234. The expansion BIOS selecting unit 22 selects appropriate expansion BIOS according to the external apparatus information and the configuration information received from the information processing unit 3. The expansion BIOS selecting unit 22 includes the configuration information receiving unit 221, an expansion card identifier determination unit 222, the expansion BIOS determination unit 223 and the expansion BIOS sending unit 224. The configuration information is an example of the first information and the external apparatus information is an example of the second information. In addition, the vendor IDs, the device IDs, the class codes, the subsystem vendor IDs, the subsystem IDs and the like in the configuration information as illustrated in FIG. 14 are examples of the configurations or the operation specifications of the expansion connection units. Further, the vendor IDs, the model numbers, the firmware (FW) versions and the like in the external apparatus information as illustrated in FIG. 23 are examples of the configurations or the operation specifications of the external apparatus. Since the server apparatus 1A determines expansion BIOS from the first information and the second information, appropriate expansion BIOS can be determined according to the configuration of the server apparatus 1A.

FIG. 24 exemplifies processes performed by the configuration information receiving unit 221. Normally, the configuration information receiving unit 221 has been started up in the processor 20 of the administration maintenance unit 2. The configuration information receiving unit 221 receives configuration information from the information processing unit 3 via the communication I/F 24. For example, the configuration information receiving unit 221 is resident in the memory 21 and is waiting for the reception until the configuration information is sent from the information processing unit 3 (S71). However, the configuration information receiving unit 221 can be configured to be called by the administration maintenance unit 2 when the configuration information is received. When the configuration information receiving unit 221 acquires the configuration information (S72), the configuration information receiving unit 221 stores the configuration information in the configuration information storing unit 231 (S73). With processes in S71 to S73 performed, the configuration information as illustrated in FIG. 14 is received and stored in the configuration information storing unit 231.

Figures 25, 26:
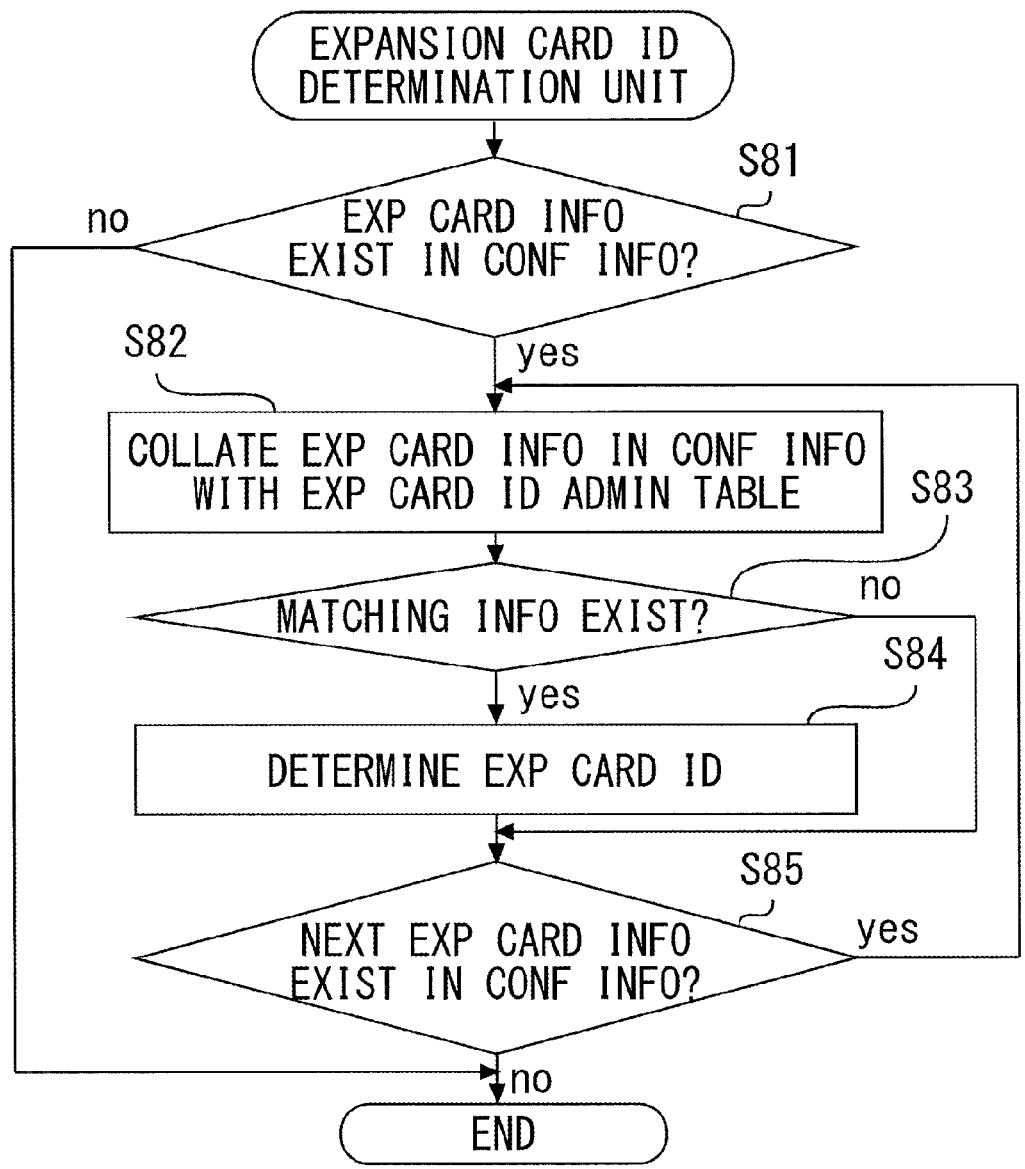
FIG. 25 is a diagram exemplifying processes performed by an expansion card identifier determination unit.
FIG. 26 is a diagram exemplifying an expansion card identifier administration table.

FIG. 25 exemplifies processes performed by the expansion card identifier determination unit 222. First, the expansion card identifier determination unit 222 refers to the configuration information stored in the configuration information storing unit 231 to determine whether or not expansion card information is found in the configuration information (S81). When the expansion card information is not found, the expansion card identifier determination unit 222 terminates the process. On the other hand, when the expansion card information is found, the expansion card identifier determination unit 222 collates the expansion card information and the expansion card identifier administration table 232C (see FIG. 26) stored in the combination table storing unit 232A (S82). The expansion card identifier administration table 232C is a table for determining expansion card identifiers by using the vendor IDs, the device IDs, the class codes, the subsystem vendor IDs and the subsystem IDs as keys. When matching information is found between the expansion card information and the expansion card identifier administration table 232C in consequence of the collation between the expansion card information and the expansion card identifier administration table 232C (S83: Y), the expansion card identifier determination unit 222 determines that the corresponding information in the expansion card identifier administration table 232C is the expansion card identifier (S84). When further expansion card information is found in the configuration information (S85: Y), the above processes are repeated for the expansion cards corresponding to the expansion card information.

In Example 2, the configuration information includes the expansion card information of FC HBA 35A and FC HBA 35B. Therefore, with the above processes performed, the expansion card identifier of FC HBA 35A is determined as "00001234" and the expansion card identifier of FC HBA 35B is determined as "00002234" as illustrated in FIG. 26.

FIG. 26 exemplifies the data configuration of the expansion card identifier administration table 232C. The expansion card identifier administration table 232C is used to determine expansion card identifiers from the information regarding the expansion cards in the configuration information. The expansion card identifier administration table 232C includes the combinations of the vendor IDs, the device IDs, the class codes, the subsystem vendor IDs, the subsystem IDs and the expansion card identifiers.

Here, the vendor IDs are information for determining the manufacturers of interface chips included in the expansion cards. In addition, the device IDs are identification information uniquely attached to the interface chips by the vendors of the interface chips included in the expansion cards. The class codes are information for determining the functions of the interface chips included in the expansion cards for example. The types, functions and the like of the interface chips are determined by the device IDs and the class codes. Further, the types and functions of the interface chips may be referred to as the types of expansion cards. The types of expansion cards include network card, graphic card, sound card, FC HBA and the like for example.

The subsystem vendor IDs are information for determining the manufacturers of expansion cards. In addition, the subsystem IDs are identification information uniquely attached to the expansion cards by the vendors of expansion cards. That is, the vendor IDs determine the manufacturers of interface chips and the subsystem vendor IDs determine the manufacturers of expansion cards.

Figure 27:
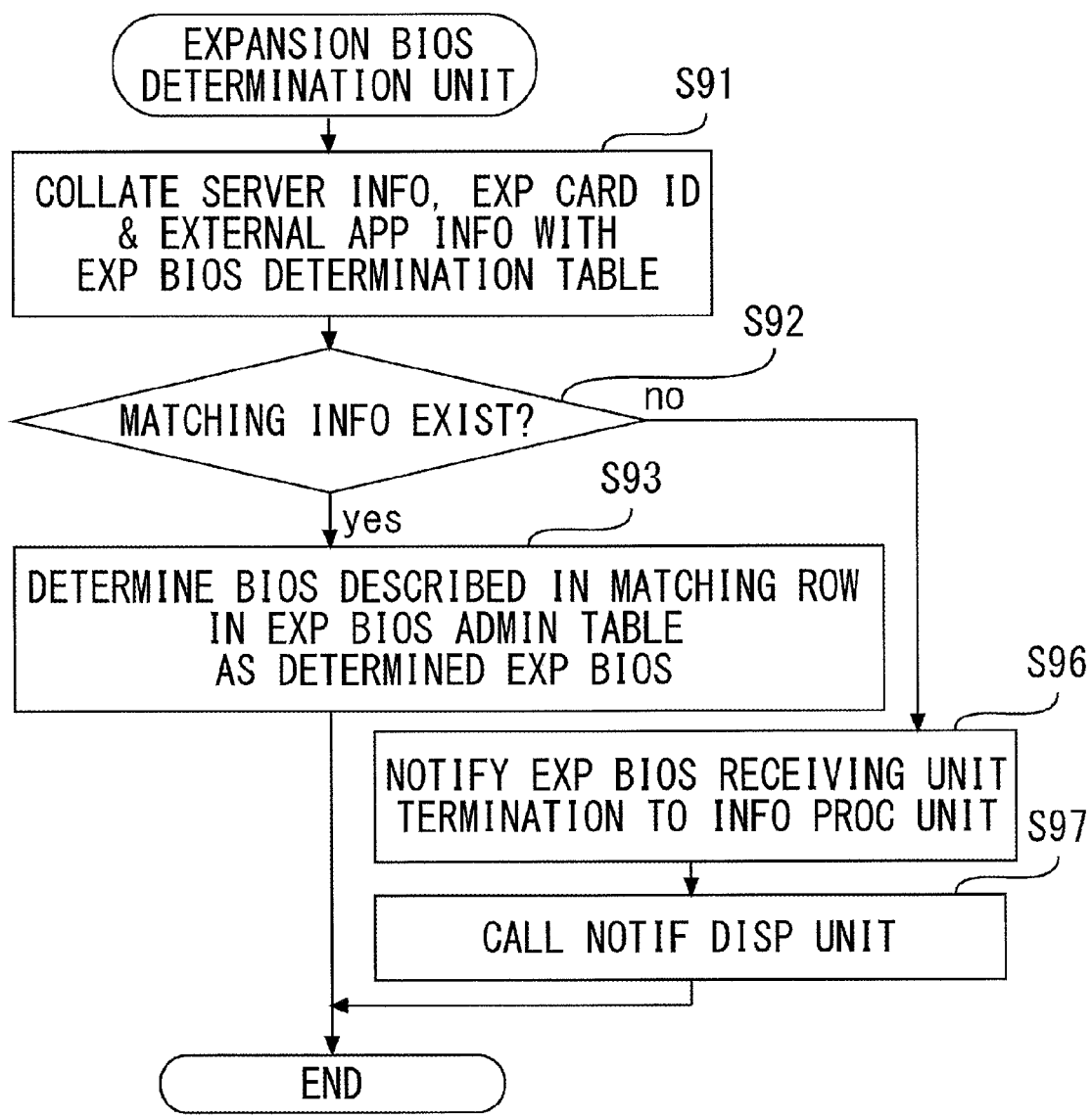
FIG. 27 is a diagram exemplifying processes performed by an expansion BIOS determination unit.

FIG. 27 exemplifies processed performed by the expansion BIOS determination unit 223. The expansion BIOS determination unit 223 collates the server information and the expansion card identifiers in the configuration information, the external apparatus information and expansion BIOS administration table 232B (see FIG. 28) stored in the combination table storing unit 232A (S91). The expansion BIOS administration table 232B is a table for determining the data of appropriate expansion BIOS by using the server information, the expansion card identifiers and the external apparatus information as primary keys. When the information matching a primary key is found in the expansion BIOS administration table 232B in consequence of the collation (S92: Y), the expansion BIOS determination unit 223 determines that the data of the appropriate expansion BIOS is the data of appropriate expansion BIOS.

When the information matching a primary key is not found in the expansion BIOS administration table 232B (S92: N), the expansion BIOS determination unit 223 sends an expansion BIOS receiving unit termination notification to the information processing unit 3 via the communication I/F 24 (S96). Further, the expansion BIOS determination unit 223 calls the notification unit to display on the display apparatus 46 a notification indicating that data of appropriate expansion BIOS is not found (S97). And then the expansion BIOS determination unit 223 terminates the processes.

Figures 28, 29:
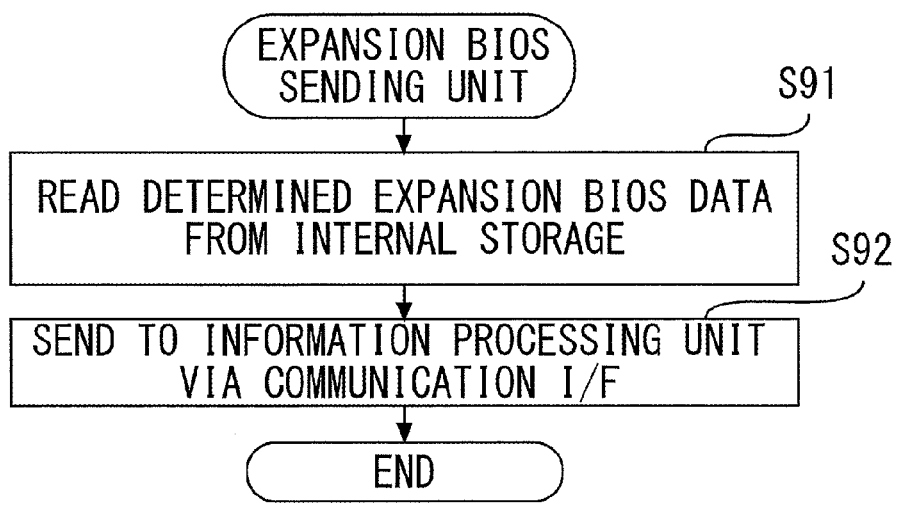
FIG. 28 is a diagram exemplifying an expansion BIOS administration table.
FIG. 29 is a diagram exemplifying processes performed by an expansion BIOS sending unit.

FIG. 28 exemplifies a configuration of the expansion BIOS administration table 232B. The expansion BIOS administration table 232B is used for determining appropriate expansion BIOS by configuration information and an expansion card identifier. Each row in the table as illustrated in FIG. 28 corresponds to a record in the expansion BIOS administration table 232B. The record in the expansion BIOS administration table 232B includes a field for input and a field for output.

In addition, the field for input includes server information, more than one sub-field for expansion card identifiers (expansion card identifier 1, expansion card identifier 2 etc.) and more than one sub-field for external apparatus.

The sub-fields for server information store information for determining servers. Further, the sub-fields for expansion card identifiers store information for identifying expansion cards. The sub-fields for external apparatus store information for identifying external apparatus connected with expansion cards.

Additionally, the field for output includes more than one field for firmware (FW1, FW2 etc.). The fields for firmware are set with information for determining firmware, concretely, information for determining expansion BIOS.

Therefore, one record in the expansion BIOS administration table 232B is used to determine appropriate firmware such as more than one expansion BIOS for the combinations of a server, more than one expansion cards and more than one external apparatus. It is noted that when a plurality of types of firmware are determined for an expansion card identifier and an external apparatus indicated by a field for input, a predetermined selection order is used. Namely, for example, a field for output to the left is preferentially selected in FIG. 28. However, it is not limited to this preference order.

With the above processes performed, the data of appropriate expansion BIOS (for example, expansion BIOS C in FIG. 28) is determined by using the server information, the expansion card identifiers "00001234" and "00002234" and the external apparatus information "VFCSW5678, FW 0101" as a primary key.

FIG. 29 exemplifies processes performed by the expansion BIOS sending unit 224. The expansion BIOS sending unit 224 reads the expansion BIOS data determined by the expansion BIOS determination unit 223 from the storage apparatus 29 of the administration maintenance unit 2 (S91). And the expansion BIOS sending unit 224 sends the expansion BIOS data to the information processing unit 3 via the communication I/F 24 (S92). With the above processes performed, the data of appropriate expansion BIOS (for example, the expansion BIOS C data) is read from the storage apparatus 29 of the administration maintenance unit 2 and sent to the information processing unit 3.

Figure 30:
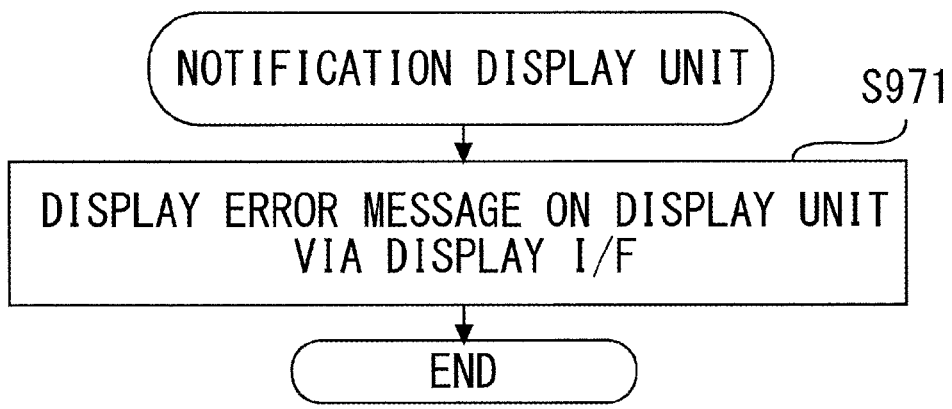
FIG. 30 is a diagram exemplifying processes performed by a notification display unit.

FIG. 30 exemplifies processes performed by the notification display unit of the administration maintenance unit 2. The notification display unit is called when the expansion BIOS determination unit fails to determine expansion BIOS data in consequence of the processes performed by the expansion BIOS selecting unit 22. When the expansion BIOS data is not determined, the notification display unit displays a message on the display apparatus 46 via the display I/F 26 in order to notify the user that expansion BIOS cannot be determined (S971). The message includes a time stamp part indicating the date and time when the message is output and a message body for example. The message is represented in such a form as "2011-11-11 11:11:11 Expansion BIOS Data Detection Failure." for example.

The data update unit of the administration maintenance unit 2 updates the data stored in the combination table storing unit 232A (hereinafter, referred to as a combination table), the expansion BIOS data stored in the storage apparatus 29 and the like.

Figure 31:
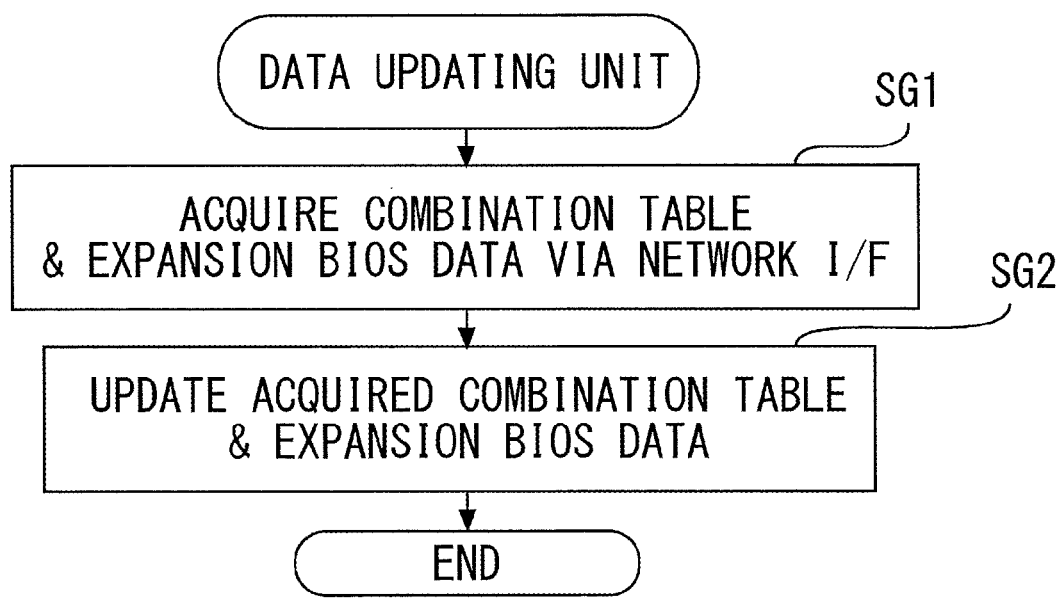
FIG. 31 is a diagram exemplifying a process flow of a data updating unit.

FIG. 31 exemplifies a process flow of the data update unit. The data update unit acquires combination tables or expansion BIOS data from the network via the network I/F 25 (SG1). Here, the combination table includes the expansion card identifier administration table 232C and the expansion BIOS administration table 232B. The data update unit uses the acquired combination table and the acquired expansion BIOS data to update the expansion BIOS data stored in the combination table storing unit 232A and the storage apparatus 29 of the administration maintenance unit 2 (SG2).

Here, the target from which the combination tables and the expansion BIOS data are acquired is an external server provided by the vendor of the administration maintenance unit 2 for example. The vendor of the administration maintenance unit 2 may be configured to provide the combination tables of appropriate expansion BIOS and the expansion BIOS data according to the configurations and the administration maintenance unit 2, which is located on the user site, may be configured to acquire the data provided by the vendor's external server.

(Processes Performed by FC SW)

Figure 32:
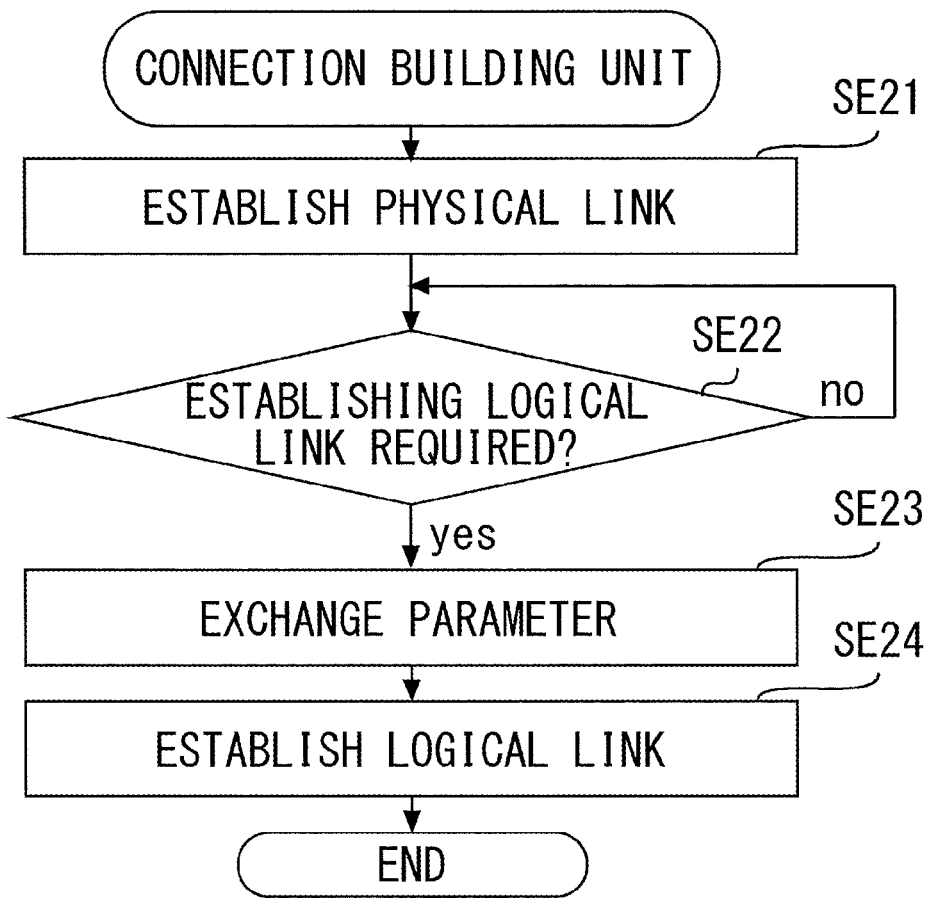
FIG. 32 is a diagram exemplifying processes performed by a connection building unit of an FC SW.

FIG. 32 exemplifies processes performed by the connection building unit 412 of FC SW 41. With the processes in FIG. 32 performed, the connection building unit 412 establishes the connection with FC HBA 35 or the storage system 42. When FC SW is connected with an apparatus on the other side via FC I/F 416, the connection building unit 412 firstly establishes a physical link (SE21). Next, when the connection building unit 412 receives an establishment request of a logical link from the apparatus on the other side connected via FC (SE22:Y), the connection building unit 412 exchange parameters with the apparatus (SE23) and establishes the logical link (SE24). When the apparatus on the other side is FC HBA 35, the timing with which FC HBA 35 sends an establishment request of a logical link to FC SW 41 is to be set after expansion BIOS enables the control of FC HBA 35 by the processor 20 of the information processing unit 3.

Figure 33:
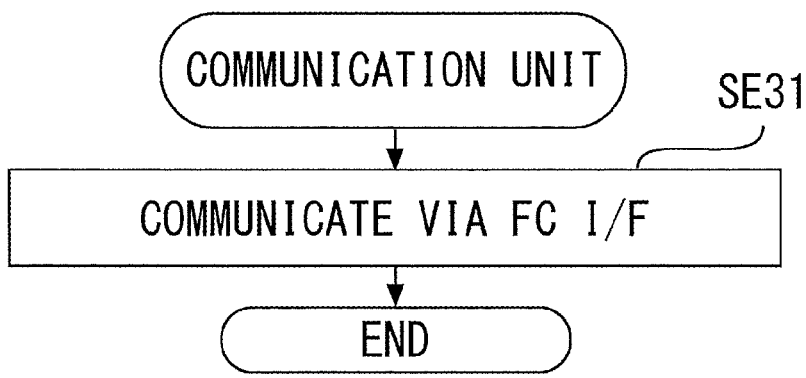
FIG. 33 is a diagram exemplifying communication processes performed by a communication unit of an FC SW.

When the connection building unit 412 establishes a logical link with an apparatus on the other side such as FC HBA 35 of the information processing unit 3, the communication unit 413 communicates with the information processing unit 3. FIG. 33 exemplifies communication processes performed by the communication unit 413 of FC SW 41. With the processes performed, the communication unit 413 communicates with the apparatus on the other side such as FC HBA 35 via FC I/F 416 (SE31). FC SW 41 includes the command receiving unit 414 as a functional unit for receiving commands externally via the network I/F 417.

Figure 34:
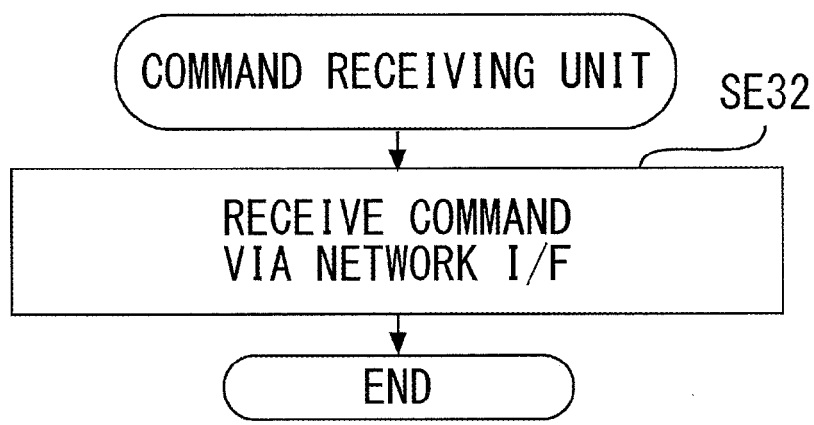
FIG. 34 is a diagram exemplifying processes performed by a command receiving unit of an FC SW.

FIG. 34 exemplifies processes performed by the command receiving unit 414 of FC SW 41. The command receiving unit 414 receives an "inquiry" command from the network I/F 25 of the administration maintenance unit 2 via the network I/F 417 (SE32).

Figure 35:
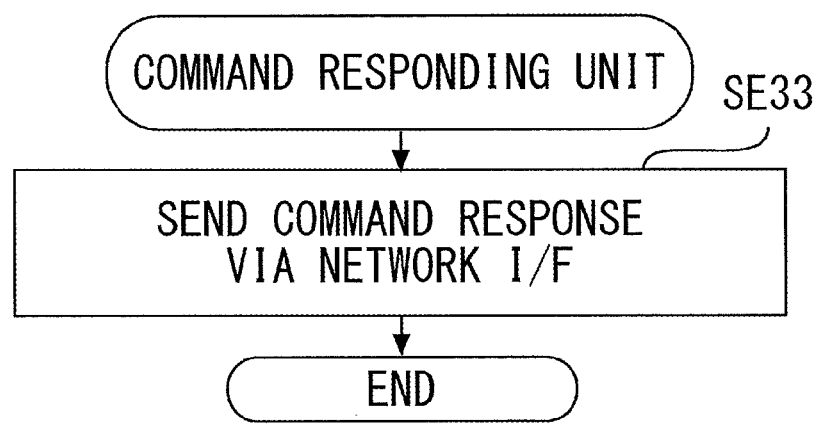
FIG. 35 is a diagram exemplifying processes performed by a command responding unit of an FC SW.

FIG. 35 exemplifies processes performed by the command responding unit 415 of FC SW 41. The command responding unit 415 sends as a response to the "inquiry" command the apparatus information of FC SW 41 such as the vendor name, the model number and the firmware version to the network I/F 25 of the administration maintenance unit 2 (SE33).

With the processes as exemplified in FIGS. 12 to 35 performed, the information processing unit 3 uses appropriate expansion BIOS (for example, expansion BIOS C in FIG. 28) corresponding to the configuration information and the external apparatus information to control FC HBA 35A and FC HBA 35B. The expansion BIOS C controls FC HBA 35A and FC HBA 35B. In addition, since the wait time of 600 ms, which is the same as the maximum value of the response time set in FC SW 41, is set to the expansion BIOS C, the operation of the expansion BIOS C is assured when the expansion BIOS C is combined with FC SW 41. Therefore, when the information processing unit 3 uses the expansion BIOS C, the server apparatus 1A normally controls FC HBAs 35A and 35B and normally communicates with FC SW 41 and the storage system 42 which is connected with FC SW 41 on a later stage.

Here, it is assumed as one example that a user adds an expansion card such as FC HBAs 35A and 35B or an external apparatus such as FC SWs 41A and 41B after the server apparatus 1A is introduced or that a user introduces an expansion card or an external apparatus instead of the existing expansion card or the existing external apparatus.

Even when the user changes the configurations of the expansion card or the external apparatus after the server apparatus 1A is introduced, the configuration information receiving unit 221 receives the configuration information of the information processing unit 3 and the configuration information acquisition unit 27 acquires the external apparatus information in the server apparatus 1A in Example 2. In addition, the expansion BIOS determination unit 223 determines appropriate expansion BIOS according to the expansion BIOS administration table 232B and the expansion card identifier administration table 232C, and the expansion BIOS sending unit 224 passes the data of the appropriate expansion BIOS stored in the storage apparatus 29 to the information processing unit 3. Thus, even when the user changes the expansion card or the external apparatus and the like after the server apparatus 1A is introduced, the processes performed by the server apparatus 1A enables the information processing unit 3 to control the expansion card or the external apparatus and the like by the appropriate expansion BIOS. Therefore, this can reduce the burdens on the user accompanied with the change of the expansion card or external apparatus and the like.

Consequently, the server apparatus 1A can be configured to update the expansion BIOS data, the expansion BIOS administration table 232B and the expansion card identifier administration table 232C stored in the storage apparatus 29. The update processes can be performed periodically. In addition, the update processes can be performed according to the user's update instructions. Further, the change of the expansion card or the external apparatus and the like can be used as a trigger to perform the update processes.

Moreover, in the configuration of the server apparatus 1A in Example 2, the administration maintenance unit 2 is connected with the communication interface 417 of FC SW 41 as an external apparatus via the communication interface 24 to acquire the external apparatus information. Therefore, the external apparatus information can be acquired without an impact to the operation stability dependent on the expansion BIOS to the contrary of the configuration in which the external apparatus information is acquired via FC HBAs 35A and 35B of the information processing unit 3.

It is noted that since the administration maintenance unit 2 is connected with the information processing unit 3 via the communication I/F 24 and the communication I/F 34, the administration maintenance unit 2 can be provided outside the server apparatus 1A by providing the communication I/F 24 outside the server apparatus 1A.

Example 3

Configurations

Figure 36:
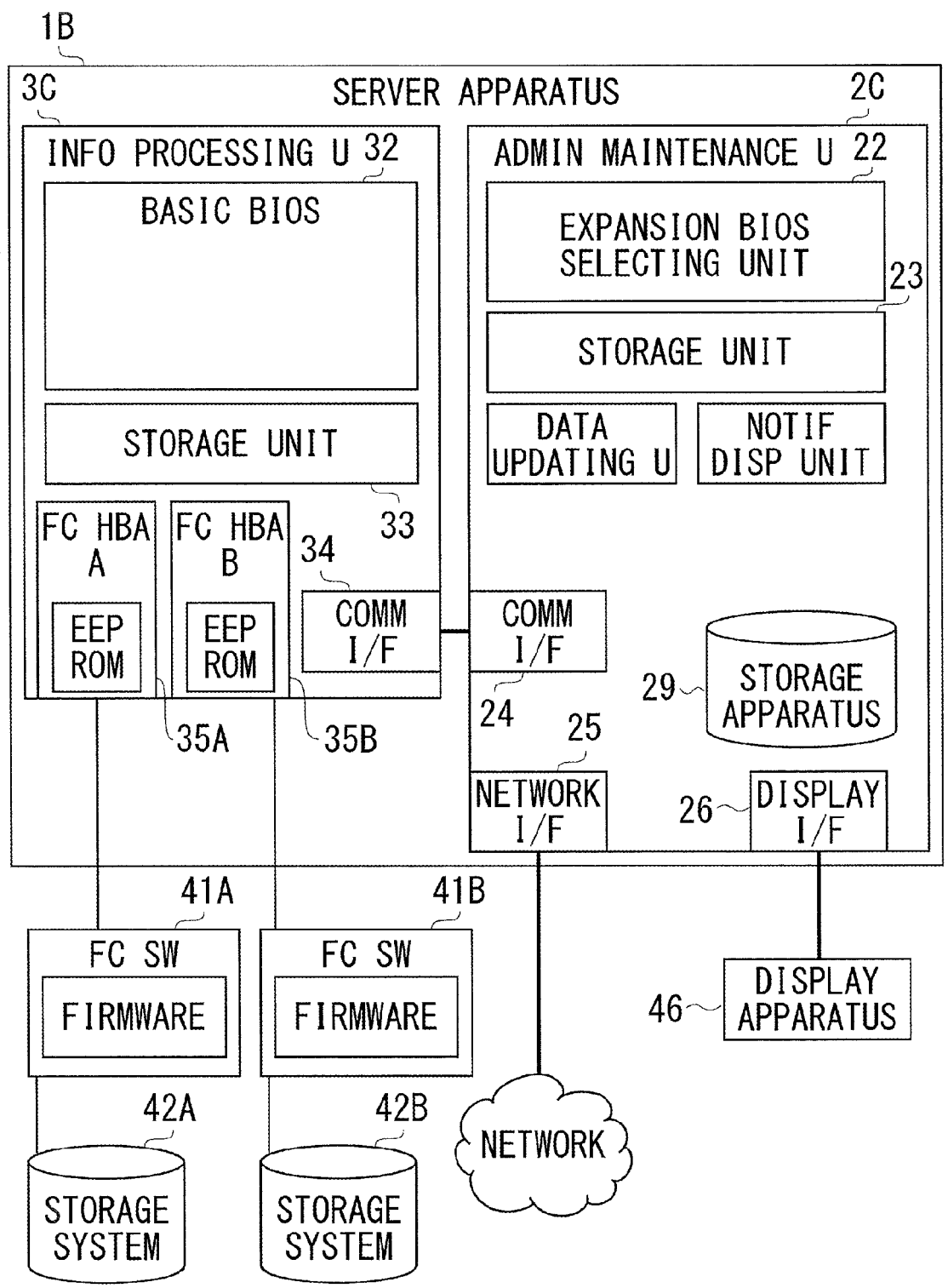
FIG. 36 is a diagram exemplifying the configuration of a server apparatus according to Example 3.

FIG. 36 is a diagram exemplifying the configuration of the server apparatus 1B in Example 3. The server apparatus 1B in Example 3 differ from the server apparatus 1A in Example 2 in that the administration maintenance unit 2 is not connected with FC SWs 41A and 41B via the network. The configurations of the server apparatus 1B other than the configuration that the administration maintenance unit 2 is not connected with FC SWs 41A and 41B via the network are the same as the configurations of the server apparatus 1A. That is, the server apparatus 1B includes the information processing unit 3C and the administration maintenance unit 2C. In addition, the information processing unit 3C is connected with FC SWs 41A and 41B and the display apparatus 46. Further, FC SWs 41A and 41B are connected with the storage systems 42A and 42B.

In Example 2 the external apparatus information is collected from FC SW 41 via the network I/F 25 by the external apparatus information acquisition unit 27 of the administration maintenance unit 2C. In Example 3, the processes for determining appropriate expansion BIOS for the configurations of the server apparatus 1B in the configuration in which the administration maintenance unit 2C is not connected with FC SW 41 via the network.

Figure 37:
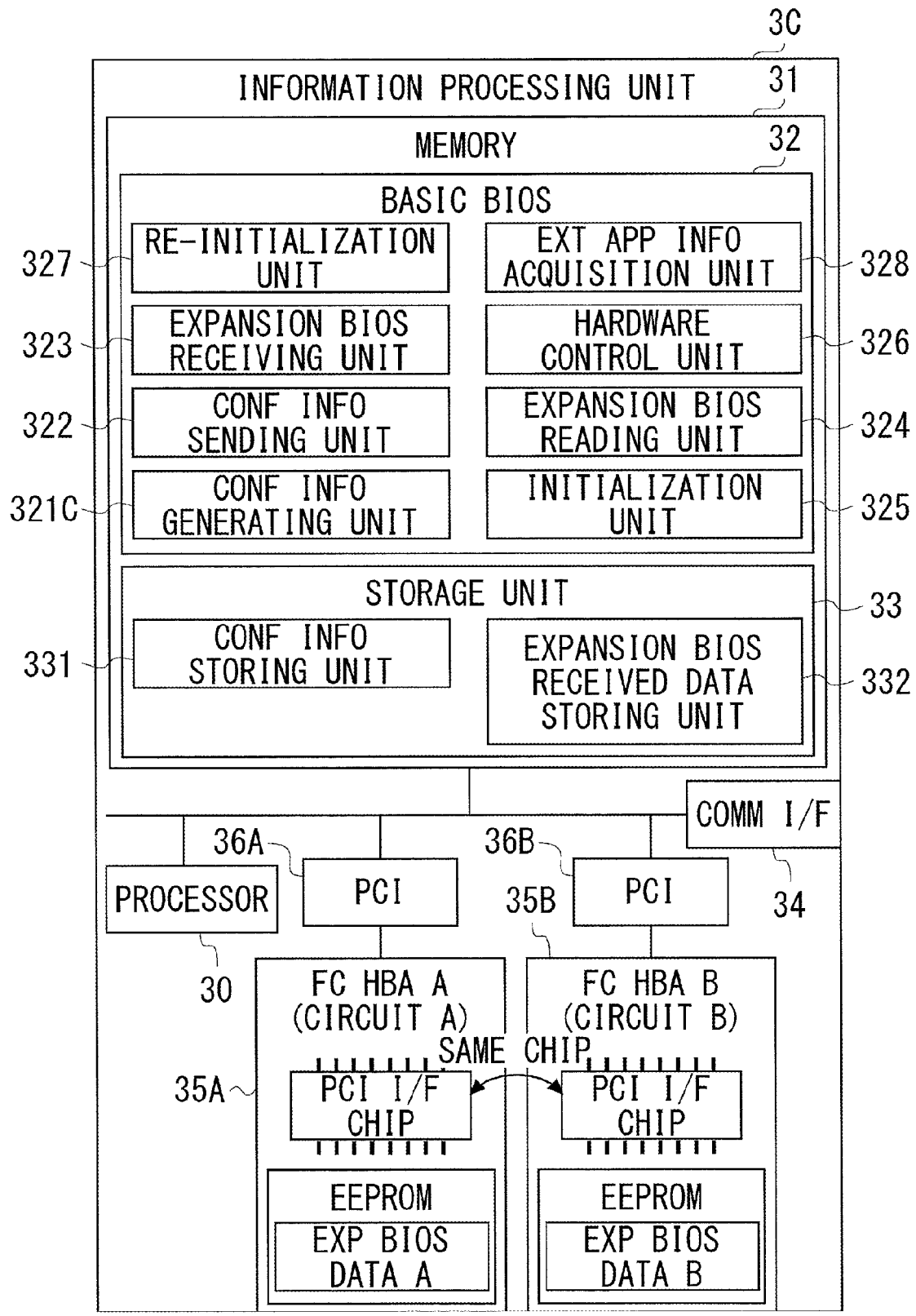
FIG. 37 is a diagram exemplifying the configuration of an information processing unit according to Example 3.

FIG. 37 is a diagram illustrating the configuration of the information processing unit 3C in Example 3. In Example 3, the initialization unit 325, the hardware control unit 326, the configuration information sending unit 322, the expansion BIOS receiving unit 323 and the expansion BIOS reading unit 324 perform processes similar to Example 2. The external apparatus information acquisition unit 328, the configuration information generating unit 321C and the re-initialization unit 327 perform processes particular to Example 3.

As described above, the administration maintenance unit 2C is not connected with FC SW 41 via the network in Example 3. Therefore, the information processing unit 3C additionally includes the external apparatus information acquisition unit 328 and the re-initialization unit 327. Except that the administration maintenance unit 2C is not connected with FC SW 41 and that the external apparatus information acquisition unit 328 and the re-initialization unit 327 are added, the configurations of the server apparatus 1B in Example 3 are similar to the configurations of the server apparatus 1A in Example 2. Thus, the same notes are given to the components in Example 3 which correspond to the components in Example 2 and the descriptions thereof are omitted here.

That is, after the information processing unit 3C is turned on, the initialization unit 325 of the basic BIOS 32 is called. Next, the expansion BIOS reading unit 324 is called. At this point the expansion BIOS data is not stored in the expansion BIOS received data storing unit 332. Therefore, the expansion BIOS reading unit 324 reads each expansion BIOS from FC HBA 35A and FC HBA 35B and stores the read expansion BIOS on the memory 31 of the information processing unit 3B (see SC 3 in FIG. 17).

And then the hardware control unit 326 uses expansion BIOS read from the memory components of expansion cards to per form device-dependent initializations and device-dependent settings and to control hardware (see FIG. 18).

Next, the external apparatus information acquisition unit 328 acquires the information of the external apparatus via each expansion card. That is, the external apparatus information acquisition unit 328 accesses to the external apparatus such as FC SW 41 in FIG. 38 connected with FC HBAs 35A and 35B, which are expansion cards, via FC HBAs 35A and 35B and acquires the external apparatus information. Incidentally, in this case, each expansion BIOS read from the expansion cards cannot control the external apparatus connected with the expansion cards as described in Example 2. However, the acquisition of information by the external apparatus information acquisition unit 328 may be performed at least once at the time of the logical link connection with the external apparatus as described in FIG. 40. Thus, when the expansion BIOS read from the expansion card is used to acquire the external apparatus information, the effects of inappropriate expansion BIOS are smaller than the effects in the normal operation state, namely, at the time of data input/output after the logical link connection.

Next, the configuration information generating unit 321C generates configuration information from the information of each piece of hardware included in the server apparatus 1B and the information of the external apparatus. In addition, the configuration information sending unit 322 sends the configuration information including the external apparatus information to the administration maintenance unit 2C.

And then the expansion BIOS receiving unit 323 receives the data of appropriate expansion BIOS corresponding to the configuration information including the information of the external apparatus from the administration maintenance unit 2C and the expansion BIOS reading unit 324 reads the data of appropriate expansion BIOS from the received data. The re-initialization unit 327 performs initialization processes for using the received expansion BIOS.

In Example 3, when the expansion BIOS is not stored in the expansion BIOS received data storing unit 332, the expansion BIOS reading unit 324 reads the expansion BIOS data from the memory component of each expansion card connected with the information processing unit 3. The processes are similar to the processes in Example 2. Further, the expansion BIOS read from the memory component of the expansion card is an example of the first control program. Moreover, the expansion BIOS reading unit 324 is an example of a unit for acquiring the first control program from the expansion connection unit.

And when appropriate expansion BIOS is stored, the expansion BIOS reading unit 324 reads the data of appropriate expansion BIOS corresponding to the configuration information including the external apparatus information from the data received from the administration maintenance unit 2C. The processes are similar to the processes in Example 2.

However, Example 3 differs from Example 2 in that the information processing unit 3C acquires the external apparatus information via the expansion cards. In addition, the information processing unit 3C sends the configuration information including the external apparatus information to the administration maintenance unit 2C. Further, the administration maintenance unit 2C determines the expansion cards and appropriate expansion BIOS corresponding to the external apparatus connected with the expansion cards, and sends the appropriate expansion BIOS to the information processing unit 3C. Moreover, when the information processing unit 3C is re-initialized, the control using the appropriate expansion BIOS is achieved.

Figure 38:
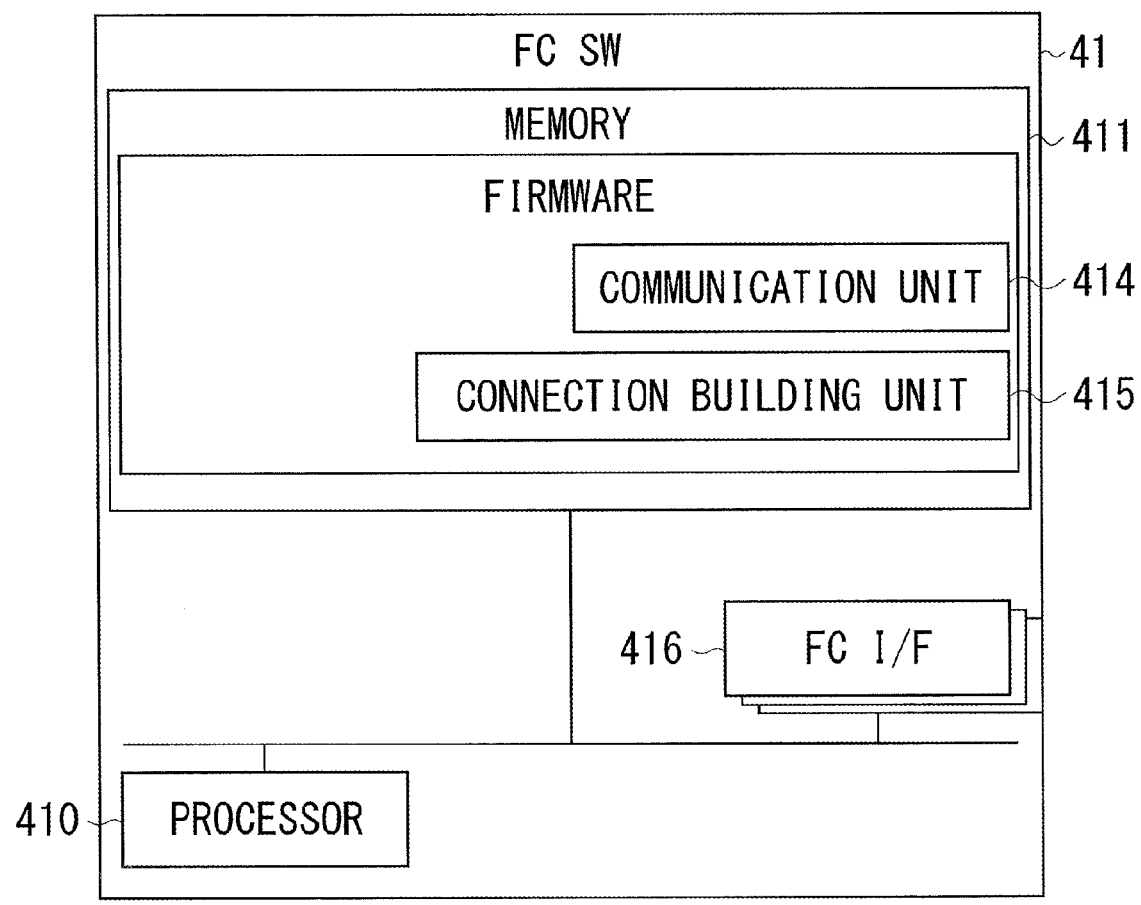
FIG. 38 is a diagram exemplifying the configuration of an FC SW.

FIG. 38 exemplifies a configuration diagram of FC SW 41. Example 3 differs from Example 2 in that the network I/F 417, the command receiving unit 414 and the command responding unit 415 are omitted. However, FC SW 41 in Example 3 may include the network I/F 417, the command receiving unit 414 and the command responding unit 415.

Figure 39:
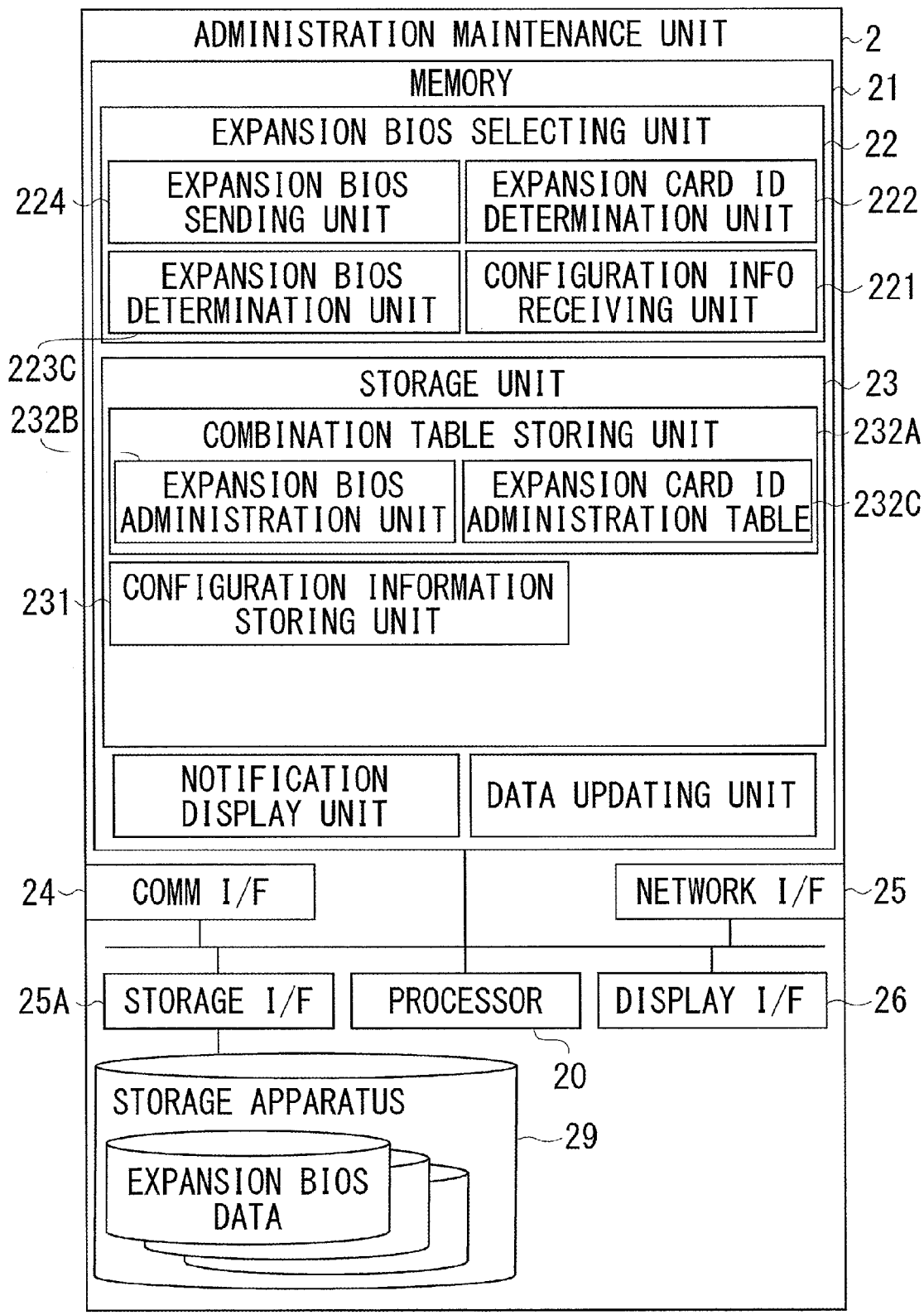
FIG. 39 is a diagram exemplifying the configuration of an administration maintenance unit.

FIG. 39 is a diagram exemplifying a configuration of the administration maintenance unit 2C. Comparing with the administration maintenance unit 20 in Example 2, the external apparatus information acquisition unit 27, the external apparatus administration table storing unit 233 and the external apparatus information storing unit 234 are omitted in the administration maintenance unit 2C in Example 3. The other components in the administration maintenance unit 2C are similar to the components in Example 2 and the descriptions thereof are omitted here.

<Process Flow>

The processes for determining appropriate expansion BIOS according to the configurations of the server apparatus 1B (information processing unit 3C) are exemplified with reference to FIGS. 40 to 44. It is assumed in performing the processes in Example 3 that the processes to be performed by the expansion BIOS reading unit 324 as illustrated in FIG. 17 in Example 2 have been performed before the expansion BIOS is determined. When the processes to be performed by the expansion BIOS reading unit 324 as illustrated in FIG. 17 are performed before the expansion BIOS is determined, that is before appropriate expansion BIOS according to the configurations of the server apparatus 1B is received, the expansion BIOS does not exist in the expansion BIOS received data storing unit 332. Therefore, since the determination in SC1 in FIG. 17 is N, the expansion BIOS on the expansion cards, namely, the expansion BIOS stored in FC HBA 35A, FC HBA 35B and the like are loaded onto the memory 31 (see SC3 in FIG. 17).

Figure 40:
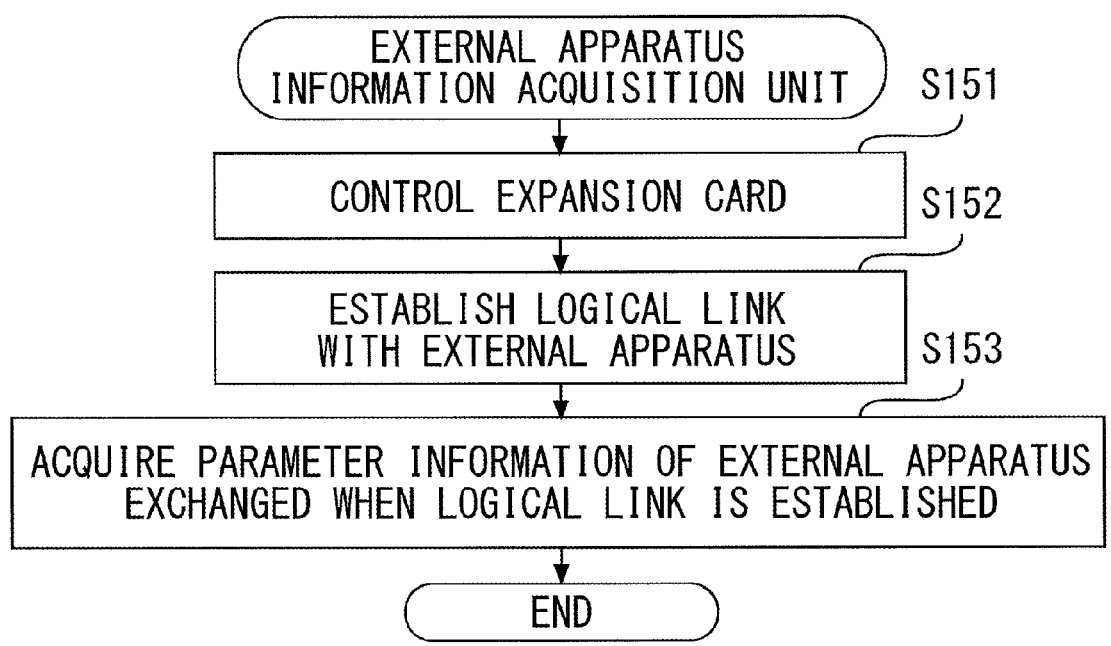
FIG. 40 is a diagram exemplifying processes performed by an external apparatus information acquisition unit.

FIG. 40 exemplifies processes performed y the external apparatus information acquisition unit 328 of the information processing unit 3C. The external apparatus information acquisition unit 328 controls the expansion cards by using expansion BIOS and establishes logical links with the external apparatus (S151, S152). The external apparatus information acquisition unit 328 is an example of the second acquisition unit. The processor 30 of the information processing unit 3C as the external apparatus information acquisition unit 328 executes the basis BIOS 32 stored in the memory 31. Incidentally, when the external apparatus information acquisition unit 328 is considered as an example of the second acquisition unit, S151 and S152 are examples of the second acquisition step. In addition, the combination of the basic BIOS on the memory 31 executed by the processor 30 and the computer program on the memory 21 executed by the processor 20 is an example of the information processing program.

For example, the logical link between FC HBA 35A and FC HBA 35B as illustrated in FIG. 36 is performed by fabric login (FLOGI). The fabric login is performed at a predetermined timing, for example, when FC SW 41 is connected with a device by use of fibre channel connection or when the server apparatus 1B sends an instruction for establishing a logical link to FC HBA 35A.

In the fabric login, FC HBA 35A, which is a device to be connected with FC SW 41A, sends a FLOGI frame to FC SW 41A. The FLOG frame includes the information of FC HBA 35A which functions as a node for fibre channel.

When FC SW 41A receives a FLOGI frame, FC SW 41A sends an accept (ACC) frame to the source (FC HBA 35A) which sends the FLOGI frame. The ACC frame includes the information of FC SW 41A and the port address which FC SW 41A allocates for the source (FC HBA 35A) which sends the FLOGI frame. When the FLOGI frame and the ACC frame are sent and received, a logical link is established between FC HBA 35A and FC SW 41A and the communication is performed.

As described above, when the logical link is established FC HBA 35A of the information processing unit 3C and FC SW 41A as an expansion card exchange the own parameter information with each other. The same is the case with FC HBA 35B and FC SW 41B. The parameter information includes the vendor information, the model number and the FW version and the external apparatus information acquisition unit 328 acquires the external apparatus information (S153). In addition, when the logical link is established in S151 and S152, the appropriate expansion BIOS is not acquired according to the configurations of the server apparatus 1B (information processing unit 3C). Therefore, when data is input and output from and to FC HBA 35A and FC SW 41A, an error and a retry may occur due to the discrepancy of the set value for timeout and the like. However, when the logical link is established in FIG. 40, the sending and receiving of the FLOGI frame and the ACC frame has to be performed. Thus, comparing to the case in which a large amount of data is stored in the storage system 42A and the like, the probability of timeout is lower and a retry can handle the timeout. In addition, the retry may not have a major impact on the data transfer speed. Therefore, even when the appropriate expansion BIOS is not acquired according to the configurations of the server apparatus 1B (information processing unit 3C), the processes as illustrated in FIG. 40 can be performed normally.

Figure 13:
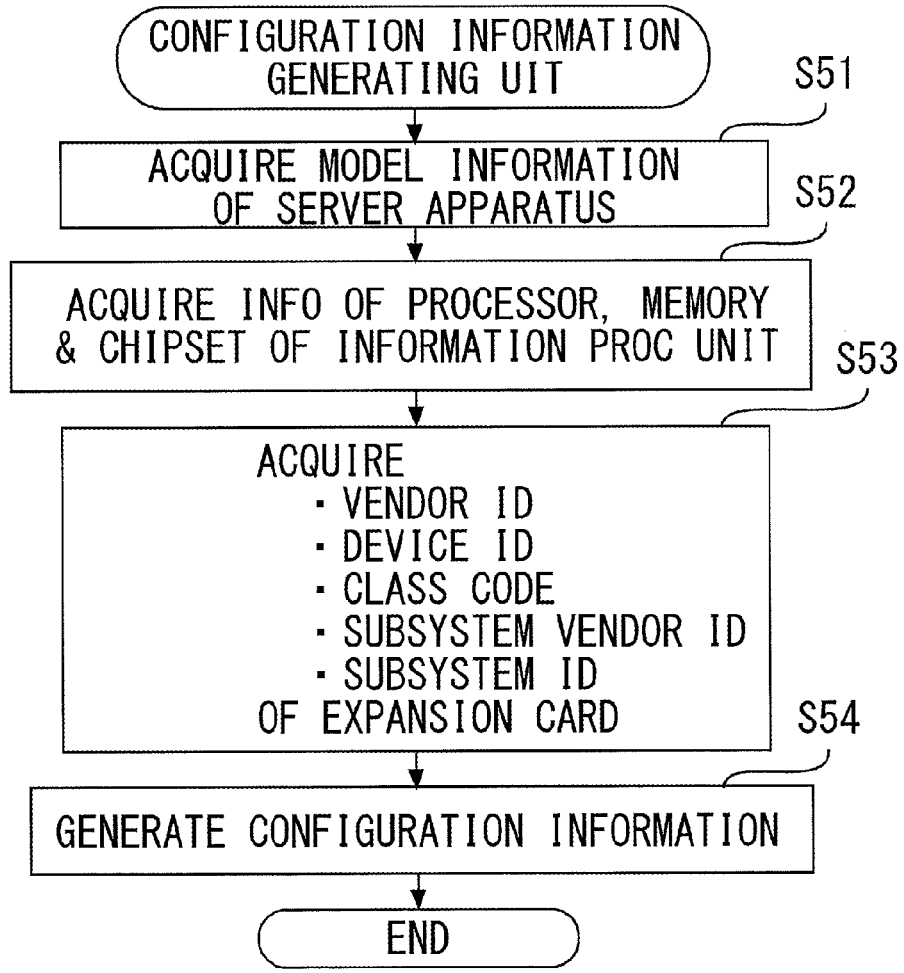
FIG. 13 is a diagram exemplifying a flow of processes performed in a configuration information generating unit.
Figure 41:
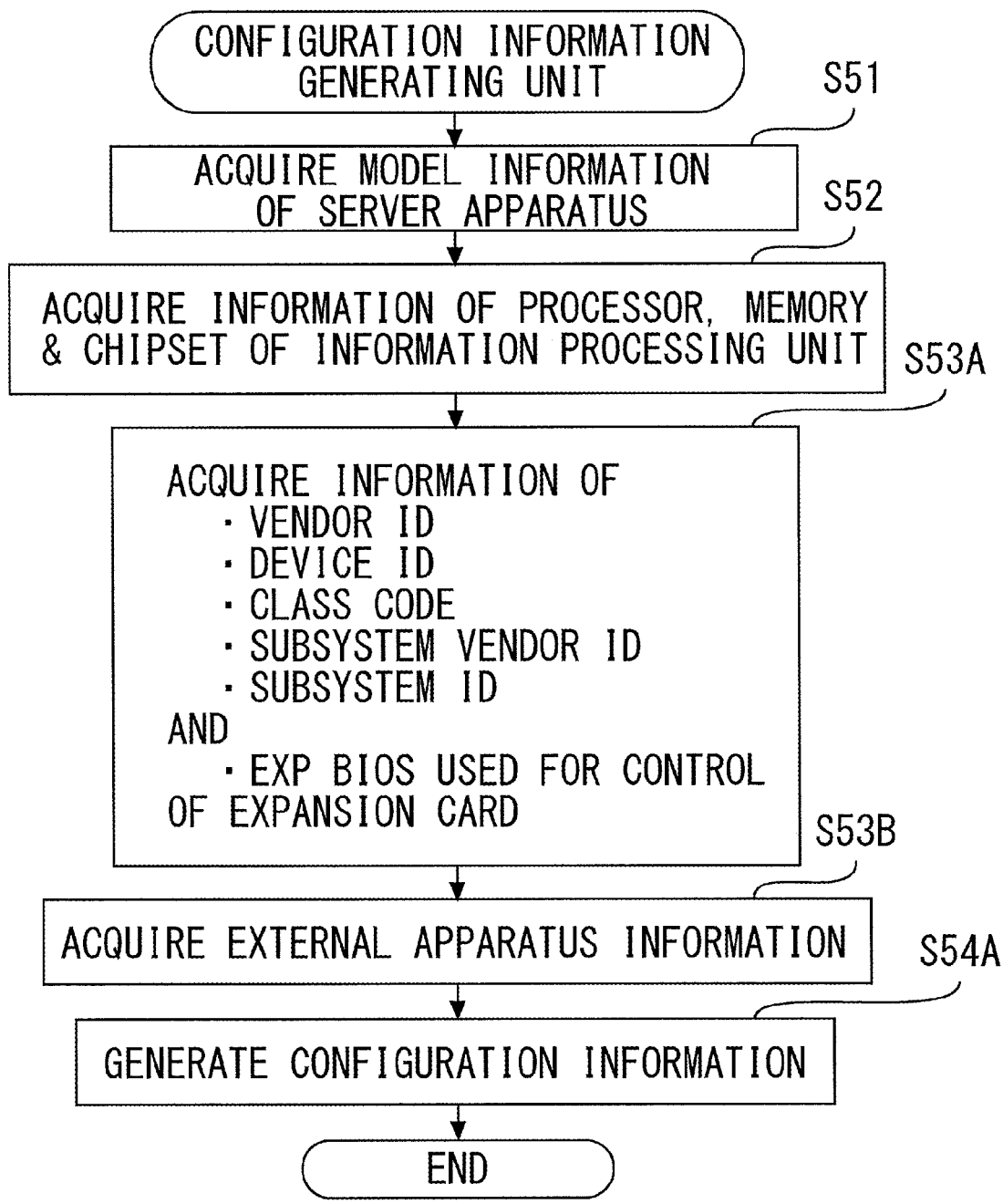
FIG. 41 is a diagram exemplifying processes performed by a configuration information generating unit.

FIG. 41 exemplifies processes performed by the configuration information generating unit 321C. In FIG. 41, the processes in S51 and S52 are similar to the processes as illustrated in FIG. 13 in Example 2. In FIG. 41, the processes in which the configuration information generating unit 321C acquires the expansion BIOS information and the external apparatus information used for the control of the expansion cards are added to the processes in Example 2.

That is, the configuration information generating unit 321C acquires the information for determining expansion BIOS used for the control of the expansion cards in addition to the vendor IDs, the device IDs, the class codes, subsystem vendor IDs and the subsystem IDs (S53A). Next, the configuration information generating unit 321C acquired the external apparatus information acquired by the external apparatus information acquisition unit 328 (S53B). And the configuration information unit 321C generates configuration information based on the information acquired in S53A and S53B (S54B). The configuration information generating unit 321C stored the generated configuration information in the configuration information storing unit 331.

FIG. 42 exemplifies configuration information generated by the configuration information generating unit 321C. The configuration information in Example 3 differs from the configuration information in Example 2 (see FIG. 14) in that the information for determining expansion BIOS is added to the expansion information (see the <used expansion BIOS> tag). In addition, the external apparatus information is added to the configuration information in Example 3 (see the <EXTERNAL APPARATUS INFORMATION> tag).

Next, the configuration information sending unit 322 sends the configuration information to the administration maintenance unit 2C. When the administration maintenance unit 2C determines appropriate expansion BIOS according to the configurations, the administration maintenance unit 2C sends the data of the determined expansion BIOS. Here, the expansion BIOS determined by and sent from the administration maintenance unit 2C is an example of the second control program.

And then the expansion BIOS receiving unit 323 receives the expansion BIOS data and stores the received data in the expansion BIOS received data storing unit 332. With the above processes performed, the expansion BIOS data appropriate to the configurations of the server apparatus 1B is stored in the expansion BIOS received data storing unit 332. Subsequently, the re-initialization unit 327 is called. the expansion BIOS read from the memory component in the expansion card is an example of the first control program.

Figure 43:
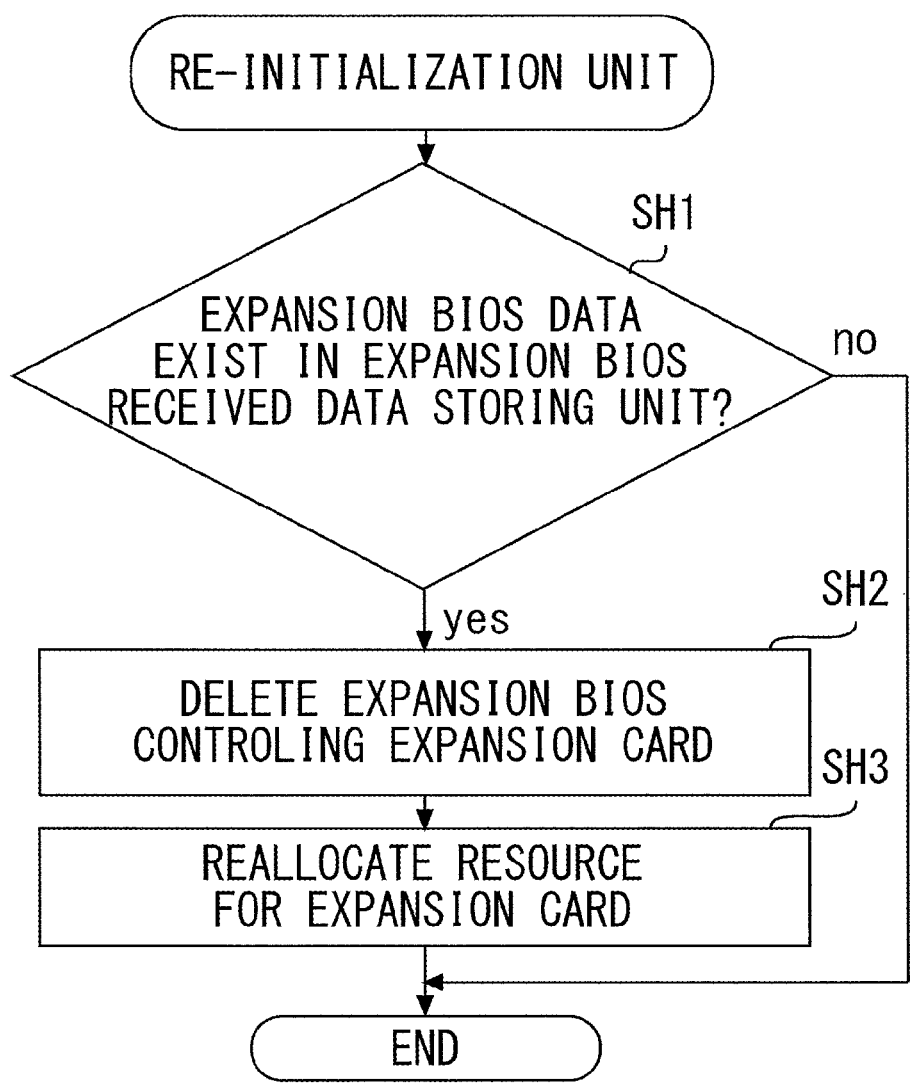
FIG. 43 is a diagram exemplifying processes performed by a re-initialization unit.

FIG. 43 exemplifies processes performed by the re-initialization unit 327. The re-initialization unit 327 determines whether or not expansion BIOS is stored in the expansion BIOS received data storing unit 332 (SH1). When the expansion BIOS is stored therein, the processes for restoring the state of the expansion card to the state in which the initialization unit is called. That is, the re-initialization unit 327 deletes the expansion BIOS which is currently stored in the memory 31 and is currently used to control the expansion card (SH2).

When the expansion BIOS controlling the expansion card is deleted, the re-initialization unit 327 calls the expansion BIOS reading unit 324 to transfer the expansion BIOS data from the expansion BIOS received data storing unit 332 to the memory of the information processing unit 3C. With the above processes performed, FC HBA 35A and FC HBA 35B return to the state in which FC HBA 35 is not operated and initialized by the expansion BIOS. And the re-initialization unit 327 performs processes such as re-allocation of the resource for the expansion card (SH3).

Subsequently, the hardware control unit 326 controls FC HBA 35A and FC HBA 35B. The hardware control unit 326 performs the control according to the expansion BIOS appropriate to the configurations of the server apparatus 1B.

Additionally, when it is determined in SH1 that expansion BIOS is not stored, the processes performed by the re-initialization unit 327 are terminated so that the processes are not performed by the expansion BIOS reading unit 324. The hardware control unit 326 continues the control using the expansion BIOS read from the expansion card.

Figure 44:
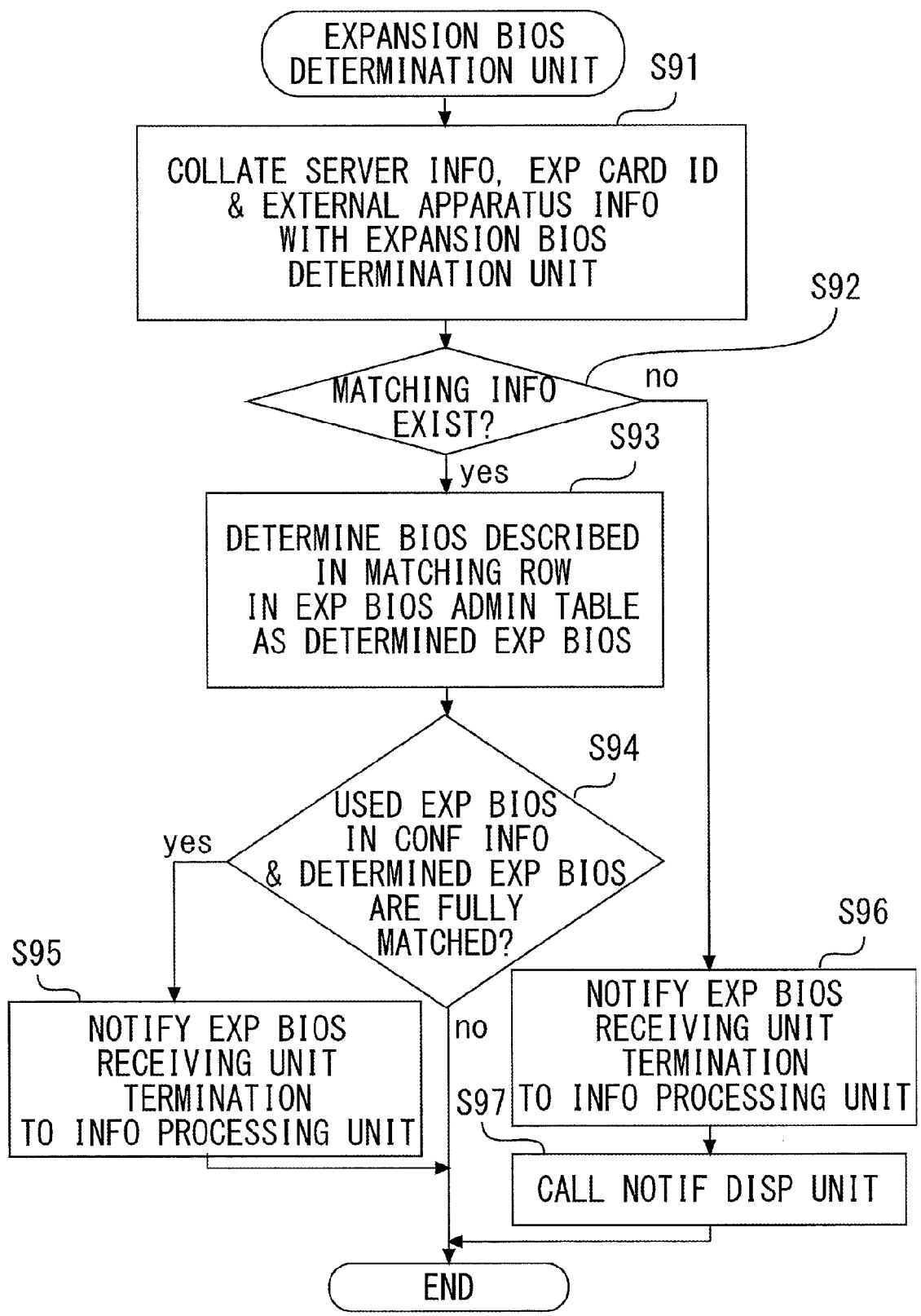
FIG. 44 is a diagram exemplifying processes performed by an expansion BIOS determination unit.

FIG. 44 exemplifies processes performed by the expansion BIOS determination unit 223C of the administration maintenance unit 2C. The processes in S91 to S93, S96 and S97 in FIG. 44 are similar to the processes in Example 2 (see FIG. 27). That is, expansion BIOS described in the matching row in the expansion BIOS administration table (for example, expansion BIOS C etc. in FIG. 28) is determined by the processes in S91 to S93.

In Example 3, it is further determined whether or not the used expansion BIOS in the configuration information and the expansion BIOS determined by the processes in S91 to S93 are matched. Here, the used expansion BIOS in the configuration information is expansion BIOS currently used by the information processing unit 3C. When it is determined in S94 that two expansion BIOS are matched, the expansion BIOS determination unit 223C sends a termination notification to the expansion BIOS receiving unit 323 of the information processing unit 3C. That is, when the expansion BIOS determined in S91 to S93 and the used expansion BIOS are matched, the expansion BIOS determination unit 223C determines that the server apparatus 1B has used appropriate expansion BIOS. And since the expansion BIOS determination unit 223C sends a termination notification to the expansion BIOS receiving unit 323, waste of time caused by the processes performed by the re-initialization unit 327 or the expansion BIOS reading unit 324 can be prevented when appropriate expansion BIOS has been configured in the server apparatus 1B.

Thus, the expansion BIOS selecting unit 22 can determine appropriate expansion BIOS according to the configurations of the information processing unit 3C by performing the processes in Example 3. Example 3 differs from Example 2 in that the external apparatus information can be acquired via FC HBAs 35A and 35B even when FC SWs 41A and 41B etc. do not include the network interface 417 as illustrated in FIG. 10.

In addition, the information processing unit 3C uses appropriate expansion BIOS according to the configuration information to control FC HBA 35A and FC HBA 35B. FC HBA 35A and FC HBA 35B can be controlled by the appropriate expansion BIOS determined by the processes in Example 3. Farther, it is ensured that the expansion BIOS normally operates in combination with FC SW 41 since the wait time is set to be 600 ms, which is also set as the maximum value of response time in FC SW 41. Therefore, when the information processing unit 3C uses appropriate expansion BIOS according to the configuration information, the server apparatus 1B can control FC HVA 35 normally and communicate with FC SW 41 and the storage system 42, which is connected with FC SW 41, normally.

For example, it is assumed here that an expansion card such as FC HBAs 35A and 35B or an external apparatus such as FC SWs 41A and 41B is added after the user introduces the server apparatus 1B or that another expansion card or another external apparatus is introduced instead of the existing expansion card or the existing external apparatus after the user introduces the server apparatus 1B.

Even when the user change the configurations of the expansion card or the external apparatus after the server apparatus 1B is introduced, the configuration information receiving unit 221 receives the configuration information of the information processing unit 3C, the expansion BIOS determination unit 223C determines appropriate expansion BIOS according to the expansion BIOS administration table 232B and the expansion card identifier administration table 232C and the expansion BIOS sending unit 224 passes the data of the appropriate expansion BIOS stored in the storage apparatus 29 to the information processing unit 3C in the server apparatus 11 in Example 3. Therefore, even when the user change expansion cards or external apparatus after the server apparatus 1B is introduced, the information processing unit 3C can use appropriate expansion BIOS to control the expansion cards and the external apparatus and the like according to the processes performed by the server apparatus 1B. Thus, the burdens on the users for changing the expansion cards and the external apparatus can be reduced.

Moreover, when the administration maintenance unit 2C fails to detect appropriate expansion BIOS or when appropriate expansion BIOS has been used for the server apparatus, the information processing unit 3C continues to use the expansion BIOS included in the expansion card in Example 3. In this case, processes which do not have to be performed, such as the re-initialization processes performed by the re-initialization unit 327 and the processes in which the expansion BIOS reading unit 324 reads expansion BIOS from the expansion BIOS received data storing unit 332, can be omitted.

<<Computer Readable Recording Medium>>

It is possible to record a program which causes a computer to implement any of the functions described above on a computer readable recording medium. By causing the computer to read in the program from the recording medium and execute it, the function thereof can be provided. Here, the computer includes the control unit 19 of the information processing apparatus 1 for example.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD), a DAT, an 8-mm tape, and a memory card. Of such recording media, those fixed to the computer include a hard disk and a ROM (Read Only Memory).

An information processing apparatus according to one embodiment can determine an appropriate control program according to the configurations of a connection apparatus which is connected with the information processing apparatus and control the connection apparatus.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
an interface configured to be connected with a connection apparatus including an expansion connection unit and an expansion apparatus connected with the expansion connection unit;
a unit configured to acquire a first control program from the expansion connection unit;
a first acquisition unit configured to acquire first information related to a configuration or an operation specification of the expansion connection unit connected with the interface;
a second acquisition unit configured to use the acquired first control program to acquire second information related to a configuration or an operation specification of the expansion apparatus connected with the expansion connection unit from the connection apparatus via the expansion connection unit;
a determination unit configured to determine a control program to control the connection apparatus based on the acquired first information and the acquired second information; and
a control unit configured to use the determined control program to control the connection apparatus.

2. The information processing apparatus according to claim 1,
wherein the determination unit determines a second control program based on the first information and the acquired second information, and
the control unit uses the second control program to control the expansion connection unit.

3. The information processing apparatus according to claim 1, wherein the second acquisition unit acquires the second information from the connection apparatus via not the expansion connection unit but a communication interface.

4. An information processing method, comprising:
acquiring a first control program from an expansion connection unit by using a processor;
acquiring first information related to a configuration or an operation specification of the expansion connection unit connected with an interface by using the processor;
acquiring second information related to a configuration or an operation specification of an expansion apparatus connected with the expansion connection unit from the connection apparatus via the expansion connection unit by using the processor and by using the acquired first control program;
determining a control program to control the connection apparatus based on the acquired first information and the acquired second information by using the processor; and
controlling the connection apparatus by using the processor and by using the determined control program.

5. The information processing method according to claim 4,
wherein the determining includes determining a second control program according to second information acquired by using the first information and the first control program, and
the controlling includes controlling the expansion connection unit by using the second control program.

6. The information processing method according to claim 4, wherein the acquiring the second information includes acquiring the second information from the connection apparatus via not the expansion connection unit but a communication interface.

7. A non-transitory computer-readable storage medium having stored therein a program for causing a computer to execute information processing comprising:
   acquiring a first control program from an expansion connection unit;
   acquiring first information related to a configuration or an operation specification of the expansion connection unit connected with an interface;
   acquiring second information related to a configuration or an operation specification of an expansion apparatus connected with the expansion connection unit from the connection apparatus via the expansion connection unit by using the acquired first control program;
   determining a control program to control the connection apparatus based on the acquired first information and the acquired second information; and
   controlling the connection apparatus by using the determined control program.

8. The non-transitory computer-readable storage medium according to claim 7,
   wherein the determining includes determining a second control program according to second information acquired by using the first information and the first control program, and
   the controlling includes controlling the expansion connection unit by using the second control program.

9. The non-transitory computer-readable storage medium according to claim 7, wherein the acquiring the second information includes acquiring the second information from the connection apparatus via not the expansion connection unit but a communication interface.

* * * * *